US009512321B2

(12) United States Patent
Shimanaka et al.

(10) Patent No.: US 9,512,321 B2
(45) Date of Patent: Dec. 6, 2016

(54) ALKOXYSILYL GROUP-CONTAINING BLOCK COPOLYMER, METHOD FOR PRODUCING THE SAME, RESIN-TREATED PIGMENT, AND PIGMENT DISPERSION

(75) Inventors: Hiroyuki Shimanaka, Tokyo (JP); Yoshikazu Murakami, Tokyo (JP); Sachio Yoshikawa, Tokyo (JP); Shinya Tsuchida, Tokyo (JP); Atsushi Goto, Kyoto (JP); Yoshinobu Tsujii, Kyoto (JP)

(73) Assignees: DAINICHISEIKA COLOR & CHEMICALS MFG. CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 278 days.

(21) Appl. No.: 13/582,007

(22) PCT Filed: Feb. 24, 2011

(86) PCT No.: PCT/JP2011/054129
§ 371 (c)(1),
(2), (4) Date: Aug. 30, 2012

(87) PCT Pub. No.: WO2011/108435
PCT Pub. Date: Sep. 9, 2011

(65) Prior Publication Data
US 2012/0329940 A1    Dec. 27, 2012

(30) Foreign Application Priority Data
Mar. 2, 2010    (JP) .................................. 2010-045655

(51) Int. Cl.
| C08F 30/08 | (2006.01) |
| C08F 20/14 | (2006.01) |
| C08F 20/30 | (2006.01) |
| C09C 3/12 | (2006.01) |
| C08F 293/00 | (2006.01) |
| C09B 67/00 | (2006.01) |
| C09B 67/08 | (2006.01) |
| C09B 67/46 | (2006.01) |
| C09D 17/00 | (2006.01) |

(52) U.S. Cl.
CPC ............ *C09C 3/12* (2013.01); *C08F 293/005* (2013.01); *C09B 67/009* (2013.01); *C09B 67/0013* (2013.01); *C09B 68/41* (2013.01); *C09D 17/001* (2013.01); *C08F 2438/00* (2013.01)

(58) Field of Classification Search
CPC ............ C08F 290/068; C08F 293/005; C08F 2438/03; C08F 220/06; C08F 220/12; C08F 220/14; C08F 220/16; C08F 220/18; C08F 230/08; C08F 2230/085; C08F 2438/00; C08F 2220/185; C08F 2220/1825; C08F 2220/1816
See application file for complete search history.

(56) References Cited

U.S. PATENT DOCUMENTS

| 5,314,960 | A | 5/1994 | Spinelli et al. |
| 2006/0194932 | A1* | 8/2006 | Farcet ............................ 525/477 |
| 2011/0021689 | A1* | 1/2011 | Schellekens et al. ........ 524/505 |
| 2011/0136965 | A1 | 6/2011 | Murakami et al. |
| 2011/0223529 | A1* | 9/2011 | Shimanaka et al. ....... 430/108.4 |

FOREIGN PATENT DOCUMENTS

| JP | 6-503103 | 4/1994 |
| JP | 11-35831 | 2/1999 |
| JP | 2000-500516 | 1/2000 |
| JP | 2000-514479 | 10/2000 |
| JP | 2000-515181 | 11/2000 |
| JP | 2002-60449 | 2/2002 |
| JP | 2005-272270 | 10/2005 |
| JP | 2006-257145 | 9/2006 |
| JP | 2007-277533 | 10/2007 |
| WO | WO99/05099 | 2/1999 |
| WO | WO 2009090252 A1 * | 7/2009 |
| WO | WO2010/013651 | 2/2010 |
| WO | WO 2010/016523 | 2/2010 |
| WO | WO 2010013651 A1 * | 2/2010 ............. C08L 53/00 |

OTHER PUBLICATIONS

Zhang et al. "Facile Fabrication of Hybrid Nanoparticles Surface Grafted with Multi-Responsive Polymer Brushes via Block Copolymer Micellization and Self-Catalyzed Core Gelation"; Journal of Polymer Science, Part A, Polymer Chemistry, vol. 46, No. 7, Apr. 2008, pp. 2379-2389.

Hawker et al. "New Polymer Synthesis by Nitroxide Mediated Living Radical Polymerizations", Chemical Review 2001, 101, pp. 3661-3688, American Chemical Society.

Kamigaito et al. "Metal-Catalyzed Living Radical Polymerization", Chemical Review 2001, 101, pp. 3689-3745, American Chemical Society.

Yamago et al. "Organoetllurium Compounds as Novel Initiators for Controlled/Living Radical Polymerizations. Synthesis of Functionalized Polystyrenes and End-Group Modifications", vol. 124, pp. 2874-2875, Journal of American Chemical Society (2002).

Yamago et al. "Tailored Synthesis of Structurally Defined Polymers by Organotellurium-Mediated Living Radical Polymerization (TERP): Synthesis of Poly(meth)acrylate Derivatives and Their Di-and Triblock Copolymers", vol. 124, pp. 13666-13667, Journal of American Chemical Society (2002).

Goto et al. "Mechanism-Based Invention of High-Speed Living Radical Polymerization Using Organotellurium Compounds and Azo-Initiators", vol. 125, pp. 8720-8721, Journal of American Society (2003).

* cited by examiner

*Primary Examiner* — Karuna P Reddy
(74) *Attorney, Agent, or Firm* — Hamre, Schumann, Mueller & Larson, P.C.

(57) ABSTRACT

Disclosed are an alkoxysilyl-containing A-B block copolymer formed from (meth)acrylate monomers as constituent monomers, characterized in that a polymer block of A chain has a number average molecular weight (Mn) of from 1,000 to 50,000 and a molecular weight distribution (Mw/Mn) of not greater than 1.6, a polymer block of B chain comprises alkoxysilyl-containing (meth)acrylate units as constituent monomer units, and the A-B block copolymer as a whole has a molecular weight distribution of not greater than 1.6, a process for the production of the block copolymer, a resin-treated pigment, and a pigment dispersion.

9 Claims, 2 Drawing Sheets

ALKOXYSILYL GROUP-CONTAINING BLOCK COPOLYMER, METHOD FOR PRODUCING THE SAME, RESIN-TREATED PIGMENT, AND PIGMENT DISPERSION

TECHNICAL FIELD

This invention relates to a novel alkoxysilyl-containing block copolymer controlled in structure. More specifically, the present invention is concerned with an alkoxysilyl-containing block copolymer, which can be obtained by a novel polymerization process and is controlled in structure. The novel polymerization process is easy to conduct polymerization, assures a good polymerization yield, uses materials which are economical and do not place much load on the environment, and requires no special compound or compounds. The present invention also pertains to a resin-treated pigment encapsulated with the block copolymer, and to a pigment dispersion making use of the pigment.

BACKGROUND ART

For providing pigments with improved dispersibility, it has conventionally been practiced to treat pigment particle surfaces by various methods. Examples include the treatment with a low-molecular compound such as rosin, the adsorption treatment with a surfactant, the coating treatment with a resin, and so on. Among these, the surface treatment of pigment particles with a resin has been studied. It is practiced, for example, to knead a pigment in the presence of a resin, to allow a pigment to precipitate subsequent to its dispersion in the presence of a resin, or to encapsulate a pigment with a resin by making use of a reaction between a resin and particle surfaces of the pigment. In the case of the encapsulation of the pigment with the resin by making use of the above-described reaction, it is required that three-dimensional crosslinking is induced through the reaction to enclose the pigment with the resin, and that the water-insoluble, and moreover, encapsulated pigment is dispersed in a solvent to form a pigment dispersion of good quality.

In particular, an inorganic pigment is high in specific gravity because of the inclusion of a metal element as its constituent. When dispersed, the inorganic pigment hence settles under gravity and the settlings aggregate hard or, even when allowed to disperse, the inorganic pigment flocculates into larger particle sizes so that the resulting dispersion cannot maintain dispersion stability as it is. With a view to overcoming these difficulties, it has been practiced to use various pigment dispersants developed for inorganic pigments or to treat pigment particles at surfaces thereof to maintain the dispersibility. As a surface treatment method for the above-mentioned approach, inorganic treatment such as silica-alumina treatment, treatment with a silane coupling agent, or resin treatment is practiced.

As methods for treating the surfaces of pigment particles with a resin, there are the following methods:

[1] After the pigment is dispersed with a resin dispersant or the like by the above-described method, the dispersed pigment is allowed to precipitate such that the pigment particles are coated at the surfaces thereof with the resin.

[2] Two kinds of compounds, which have groups reactable with each other, respectively, or a compound or resin, which has mutually-reactable groups in a molecule thereof, are added, and these reactable groups are allowed to react with each other on the surfaces of the pigment particles to form three-dimensional linkages such that the pigment particles are encapsulated with the resultant, solvent-insoluble resin.

[3] The resin and the pigment (especially, an inorganic pigment) are chemically bonded with each other by the below-described procedure. In this case, a compound having a group reactable to the surfaces of inorganic pigment particles, that is, an alkoxylsilyl group, titanate group, zirconia group or the like and a functional group such as a thiol group, amino group or glycidyl group is first allowed to react with the surfaces of the pigment particles or the surfaces of pigment particles surface-treated with an inorganic compound introduced beforehand. Using a resin having groups reactable with functional groups such as the amino groups, the functional groups and the resin are next reacted with each other to coat the pigment particles with the resin.

[4] A resin having functional groups such as alkoxysilyl groups is allowed to react with the surfaces of the pigment particles or the pigment particles surface-treated with an inorganic compound as a surface treatment such that the pigment particles are treated at the surfaces thereof with the resin.

[5] A silane coupling agent or the like, which has a functional group, for example, a vinyl group, (meth)acryloyloxy group or thiol group, that takes part in polymerization, is reacted to the surfaces of the pigment particles, and polymerization is then conducted in the presence of a monomer to introduce the functional groups in the resultant polymer.

Recently, there is also a method such as that to be described below.

[6] In living radical polymerization, initiation groups for the living radical polymerization, for example, bromoisovaleric acid is introduced, and the living radical polymerization is conducted to bond the terminals of the resultant polymer with the surfaces of the pigment particles.

On the other hand, processes, which make use of living radical polymerization, have been developed in recent years for the production of block copolymers, including polymerization processes that permit easy control of structure and molecular weight. Specific examples include those to be described below, and a wide variety of research and development activities are now underway.

The nitroxide mediated polymerization (NMP) process that makes use of dissociation and bonding of amine oxide radicals (see Non-patent Document 1).

The atom transfer radical polymerization (ATRP) process that conducts polymerization in the presence of a halogen compound as an initiating compound by using a heavy metal such as copper, ruthenium, nickel or iron and a ligand capable of forming a complex with the heavy metal (see Patent Document 1, Patent Document 2, and Non-patent Document 2).

The reversible addition-fragmentation chain transfer (RAFT) process that conducts polymerization by using an addition-polymerizable monomer and a radical polymerization initiator in the presence of a dithiocarboxylate ester, a xanthate compound or the like as an initiating compound (see Patent Document 3), and the macromolecular design via interchange of xanthate (MADIX) process (see Patent Document 4).

The degenerative transfer (DT) process that makes use of a heavy metal such as an organotellurium compound, organobismuth compound, organoantimony compound, antimony halide, organogermanium compound or germanium halide (see Patent Document 5 and Non-patent Document 3).

PRIOR ART DOCUMENTS

Patent Documents

Patent Document 1: JP-A-2000-500516
Patent Document 2: JP-A-2000-514479
Patent Document 3: JP-A-2000-515181
Patent Document 4: WO 1999/05099
Patent Document 5: JP-A-2007-277533

Non-Patent Documents

Non-patent Document 1: Chemical Review (2001) 101, p3661
Non-patent Document 2: Chemical Review (2001) 101, p3689
Non-patent Document 3: Journal of American Chemical Society (2002) 124 p2874, ibid. (2002) 124 p13666, ibid. (2003) 125 p8720.

DISCLOSURE OF THE INVENTION

Problem to be Solved by the Invention

According to a study by the present inventors, the use of the above-described methods for the resin treatment of pigment particle surfaces, however, involve their own problems as will be described below. First, with the method [1] that, after a pigment is dispersed with a resin dispersant, the dispersed pigment is allowed to precipitate for coating treatment, the resin dispersant and the pigment are not chemically bonded with each other so that the resin dispersant may separate to lead to a reduction in the effects of the capsules, that is, the resin-treated pigment.

With the methods [2], [3] and [4], the encapsulation with the resin can bring about the effects of the encapsulation, but is not effective for dispersion. These methods, therefore, need combined use of a dispersant to conduct conventional dispersion.

Further, the reaction of an inorganic pigment, which has been treated with a silane coupling agent or the like containing one or more functional groups, with a resin, which has groups reactable with such functional groups, requires to include two steps, one being first to treat with the silane coupling agent or the like and the other to then conduct the reaction, so that this method is irksome. In addition, the reaction between the functional groups and the resin, which is to be conducted subsequent to the reaction between the coupling groups and the surfaces of the inorganic pigment, is time-consuming or is low in reactivity, so that resin coating may not be achieved fully. Furthermore, the resin with the functional groups contained therein may contribute to the bonding of the particles themselves so that the particle sizes may not be reduced to result in inferior dispersibility. On the other hand, it may be contemplated that highly-efficient resin treatment may be conducted if the resin contains a reactive group only at ends thereof. It is, however, cumbersome and difficult to provide a resin with a reactive group only at ends thereof.

According to the method [5], functional groups that contribute to polymerization have been introduced on pigment particle surfaces by a silane coupling agent or the like, and in the presence of the functional groups, the polymerization is conducted. The introduction of the resin is easy accordingly. However, a resin that does not bond to the pigment particle surfaces may be formed at the stage of the polymerization, or polymerization may take place between the particles themselves to result in inferior dispersibility. In addition, it is necessary to conduct the polymerization with the pigment being maintained in a dispersed state. Moreover, it is also necessary to lower the concentration of the monomer relative to the pigment and also to lower the content of polymerization solids, and therefore, the rate of polymerization may be poor. Still moreover, the productivity may be low from the industrial standpoint because the production is performed batchwise.

The method [6] is excellent in that a resin can be introduced at very high density onto the surfaces of inorganic particles, but may be low in productivity in some instances.

However, the above-described living radical polymerization processes are each accompanied by such problem or problems as will be described next. In the NMP process, for example, tetramethylpiperidine oxide radicals are used, and in this case, an elevated polymerization temperature of 100° C. or higher is needed. To achieve a higher polymerization degree, a monomer needs to be singly subjected to polymerization without using any solvent, thereby requiring stricter polymerization conditions. Moreover, with this polymerization process, polymerization of a methacrylate monomer is not allowed to proceed in general. It may be possible to lower the polymerization temperature or to polymerize the methacrylate monomer, but in such a case, a special nitroxide compound is needed.

In the ATRP process, the use of a heavy metal is needed. After the polymerization, it is, therefore, necessary to remove the heavy metal from the resulting polymer to purify the polymer even if the heavy metal is contained in a trace amount. When the polymer is purified, the heavy metal that places a high load on the environment is also contained in effluent water and/or waste solvent during purification treatment, and therefore, the removal of the heavy metal from the effluent water and/or waste solvent is needed to purify the effluent water and/or waste solvent. In the ATRP process that makes use of copper, on the other hand, polymerization needs to be conducted under an inert gas because, if oxygen exits in a polymerization atmosphere, the cuprous copper catalyst is oxidized into cupric copper so that the catalyst is deactivated. In this case, there is a method that adds a stannic compound, ascorbic acid or the like as a reducing agent to convert the cupric copper back into the cuprous copper. Even with this method, there is a potential problem that the polymerization may also terminate halfway. Therefore, it is also essential to fully eliminate oxygen from the polymerization atmosphere in this case.

In the ATRP process that conducts polymerization by forming a complex while using an amine compound as a ligand, the existence of an acidic substance in the polymerization system inhibits the formation of the complex. With this process, it is, therefore, difficult to polymerize an addition-polymerizable monomer containing an acid group. For introducing acid groups into the polymer by this process, the monomer has to be polymerized with its acid group being protected, and after the polymerization, the protecting group has to be removed. It is hence not easy to introduce acid groups into the resulting polymer block.

The process described in Patent Document 1 and Patent Document 2 cited above as conventional technologies uses copper. After the polymerization, copper thus needs to be eliminated to purify the resulting polymer. If an acid that inhibits the formation of a complex from copper and a ligand exists, no polymerization is allowed to proceed. With the technologies described in these documents, a monomer having an acid group cannot, therefore, be polymerized as it is.

Further, the RAFT process or MADIX process requires to synthesize and use a special compound such as a dithiocarboxylate ester or xanthate compound. As this process uses such a sulfur-containing compound, an unpleasant sulfur smell remains in the resulting polymer. In addition, the polymer is colored. It is, therefore, necessary to eliminate these smell and color from the synthesized polymer. The DT process makes use of a heavy metal like the ATRP process, and therefore, the heavy metal needs to be eliminated from the synthesized polymer. A problem of purification of effluent water that contains the heavy metal, therefore, arises when it is eliminated.

Therefore, an object of the present invention is to provide a block copolymer, which can subject a pigment to resin treatment with good productivity and can provide the resin-treated pigment with good dispersion stability. Another object of the present invention is to provide a production process which makes it possible to stably obtain the polymer with ease. A further object of the present invention is to provide a pigment dispersion, which contains a pigment in a finely-dispersed state, is stable, and moreover, is useful as a colorant for various products.

Means for Solving the Problem

The above-described objects of the present invention can be achieved as will be described next. A resin that characterizes the present invention is a block copolymer having a polymer block of A chain and a polymer block of B chain. The polymer block of A chain can function as a solvent-soluble chain, while the polymer block of B chain can function as a reactive chain containing an alkoxysilyl group as a reactive group. Different from the conventional living radical polymerization described above, the block copolymer is free of a smell or color, is free of the problem associated with the use of a heavy metal or cost problem, and moreover, can be obtained by a very easy polymerization process.

Owing to the use of the alkoxysilyl-containing block copolymer that characterizes the present invention, the encapsulation of a pigment can be easily conducted through such a reaction at particle surfaces of the pigment as will be described hereinafter. Described specifically, the pigment is encapsulated with the block copolymer by the self-condensation of alkoxysilyl groups in the B chain of the block copolymer. As an alternative, by condensation of a hydroxyl group of an inorganic pigment or a pigment surface-treated with an inorganic compound and silanol groups derived from the alkoxysilyl groups in the B chain of the block copolymer, the block copolymer is allowed to bond to the particle surfaces of the pigment to encapsulate the pigment.

When the encapsulation-treated pigment is dispersed in a dispersion medium, the treated pigment is dissolved in the dispersion medium to show good compatibility and dispersibility owing to the A chain that functions as a solvent-soluble chain which constitutes the block copolymer. Therefore, the use of the treated pigment makes it possible to obtain a high-stability pigment dispersion in which the pigment is finely dispersed to high degree.

The term "encapsulated" as used herein means that a pigment is covered at some or all of its surfaces with the above-described block copolymer by self-condensation of the block copolymer or by a reaction of the block copolymer with hydroxyl groups or the like on the surfaces of the pigment.

An alkoxysilyl-containing block copolymer, which is provided by the present invention and has the above-described advantageous effects, is characterized in that a polymer block of A chain has a number average molecular weight (Mn) of from 1,000 to 50,000 and a molecular weight distribution (Mw/Mn) of not greater than 1.6, a polymer block of B chain comprises alkoxysilyl-containing (meth) acrylate units as constituent monomer units, and the A-B block copolymer as a whole has a molecular weight distribution of not greater than 1.6.

As preferred embodiments of the above-described alkoxysilyl-containing block copolymer according to the present invention, the polymer block of B chain may have a molecular weight of not higher than 5,000, and the polymer block of A chain may comprise carboxyl-containing (meth)acrylate units as constituent monomer units and may have an acid value of from 50 to 250 mgKOH/g.

In another aspect of the present invention, there is also provided a process for producing the above-described alkoxysilyl-containing block copolymer. Described specifically, the production process is a production process for obtaining the alkoxysilyl-containing block copolymer of any one of the above-described embodiments, and is characterized in that the block copolymer is synthesized by a living radical polymerization process which uses at least an iodine compound as a polymerization initiator compound (which may be called simply "initiator compound"). As a preferred embodiment of the production process, there is a process for producing the alkoxysilyl-containing block copolymer, in which the synthesis by the living radical polymerization process may use, as a catalyst, at least one compound selected from the group consisting of phosphorus halides, phosphite compounds and phosphinate compounds, as phosphorus compounds; imide compounds, hydantoin compounds, barbituric acid compounds and cyanuric acid compounds, as nitrogen compounds; phenolic compounds, iodoxyphenyl compounds and vitamins, as oxygen compounds; and diphenylmethane compounds, cyclopentadienes and acetoacetyl compounds, as carbon compounds.

In a further aspect of the present invention, there is also provided a resin-treated pigment characterized in that an inorganic pigment and/or organic pigment has been encapsulated with at least one of the alkoxysilyl-containing block copolymers described above.

Further, the following embodiments can be mentioned as a preferred embodiment of the resin-treated pigment. Described specifically, the encapsulation may have been achieved through a self-condensation reaction of the alkoxysilyl groups, and the encapsulation may have been achieved through a condensation reaction between hydroxyl groups on particle surfaces of one of an inorganic pigment or an inorganic pigment or organic pigment treated with an inorganic compound, and the alkoxysilyl groups contained in the block copolymer. In addition, amass ratio of the inorganic pigment and/or organic pigment to the alkoxysilyl-containing block copolymer may be from 40/60 to 99/1, and the inorganic pigment may be at least one inorganic pigment selected from the group consisting of titanium oxide, zinc oxide, and pigments surface-treated with these inorganic compounds.

In a further aspect of the present invention, there is also provided a pigment dispersion characterized in that the above-described resin-treated pigment is dispersed in a dispersion medium comprising at least one medium selected from the group consisting of water, organic solvents and resins.

In a still further aspect of the present invention, there is also provided an ionized, resin-treated pigment characterized in that carboxyl groups of a resin-treated pigment obtained by encapsulating an inorganic pigment and/or organic pigment with the alkoxysilyl-containing block copolymer, in which the polymer block of A chain comprises carboxyl-containing (meth)acrylate units as constituent monomer units and has an acid value of from 50 to 250 mgKOH/g, have been neutralized with an alkaline material.

In a yet still further aspect of the present invention, there is also provided a water-based pigment dispersion characterized in that the ionized, resin-treated pigment described above is dispersed in a water-containing dispersion medium.

In an even yet still further aspect of the present invention, there is also provided a water-based pigment dispersion characterized in that a resin-treated pigment subjected to encapsulation treatment through a reaction of the alkoxysilyl groups of the alkoxysilyl-containing block copolymer, in which the polymer block of A chain comprises carboxyl-containing (meth)acrylate units as constituent monomer units and has an acid value of from 50 to 250 mgKOH/g, on particle surfaces of a pigment has been neutralized with an alkaline material and is dispersed in a water-containing dispersion medium.

The above-described pigment dispersions according to the present invention can each be used as a colorant in various products such as, for example, paints, inks, coating formulations, stationery, toners and plastics.

Advantageous Effects of the Invention

The alkoxysilyl-containing A-B block copolymer according to the present invention has a characteristic structure specified in the present invention, and exhibits an outstanding effect that owing to the structure, it shows the below-described behaviors to afford a good pigment dispersion. Described specifically, the alkoxysilyl-free polymer block of A chain in the structure of the A-B block copolymer functions as a solvent-soluble chain, so that the A-B block copolymer according to the present invention is soluble, miscible, dispersible or fusible in a solvent and hence, is compatible with a dispersion medium. At the same time, the alkoxylsilyl-containing polymer block of B chain in the structure of the A-B block copolymer can react to a pigment or a pigment surface-treated with an inorganic compound. As a consequence, when the pigment is encapsulated with the block copolymer of the present invention that has the above-described structure, the alkoxysilyl groups in the B chain are crosslinked by self-condensation so that the block copolymer takes a three-dimensional structure, or the alkoxysilyl groups in the B chain react to hydroxyl groups or the like on the surfaces of the pigment. The encapsulating resin, therefore, does not separate from the pigment particles. On the other hand, the A chain that constitutes the block copolymer according to the present invention spreads in the dispersion medium to afford a good dispersion.

If the molecular weight of the alkoxylsilyl-containing polymer block of B chain is excessively high, single block copolymer chains are considered to bond pigment particles themselves so that no fine dispersion can be afforded in some instances. In a preferred embodiment of the present invention, the molecular weight of the B chain is hence designed to be as low as 5,000 or smaller, thereby making it possible to avoid the bonding of particles themselves, and hence, to afford a fine dispersion of the pigment as primary particles.

The block copolymer according to the present invention, which can exhibit the above-described outstanding advantageous effects, is not available from the conventionally-known radical polymerization, because in the conventional radical polymerization, recombination or disproportionation takes place as a side reaction to terminate the polymerization. With the conventional methods, it is impossible to obtain a block copolymer of a desired structure. Living radical polymerization was invented, but was still accompanied by problems as described above. When the block copolymer is produced by the novel living radical polymerization developed by the present inventors, on the other hand, the target product can be easily obtained only from relatively economical materials available on the market without using any heavy metal compound, absolutely needing the purification of the polymer, or synthesizing any special compound or compounds. The novel living radical polymerization developed by the present inventors is, therefore, very effective as a process for obtaining the block copolymer of the present invention that has the characteristic structure. As polymerization conditions, the novel living radical polymerization developed by the present inventors can be conducted under similar mild conditions as for the conventional radical polymerization processes, and does not require any special apparatus. A conventional radical polymerization apparatus can, therefore, be used as it is. Moreover, the novel living radical polymerization is not affected much by oxygen, water or light during the polymerization. The monomers, solvent and the like, which are to be used, do not require purification. Monomers having various functional groups can be used, thereby making it possible to introduce various functional groups onto the polymer as desired. According to the production process of the present invention, the rate of polymerization is very high in addition to the above-described various effects, the block copolymer of the present invention can be easily produced in large quantity, and the economy is also excellent.

Upon encapsulation of a pigment through a reaction of the pigment and the alkoxysilyl-containing block copolymer according to the present invention, it is only necessary to react the pigment with the alkoxysilyl-containing block copolymer produced beforehand. By the process which requires only a single step, enables mass production and is very high in production efficiency, the resin-treated pigment encapsulated with the resin can be obtained.

When dispersed in dispersion media such as water, organic solvents and resins, these resin-treated pigments can provide colorants that can impart high transparency, high coloring power, high dispersion stability, fine dispersion properties, and high heat resistance. The colorants can be used for many applications such as paints, inks, coating formulations, stationery, toners and plastics.

MODES FOR CARRYING OUT THE INVENTION

Figure 1:
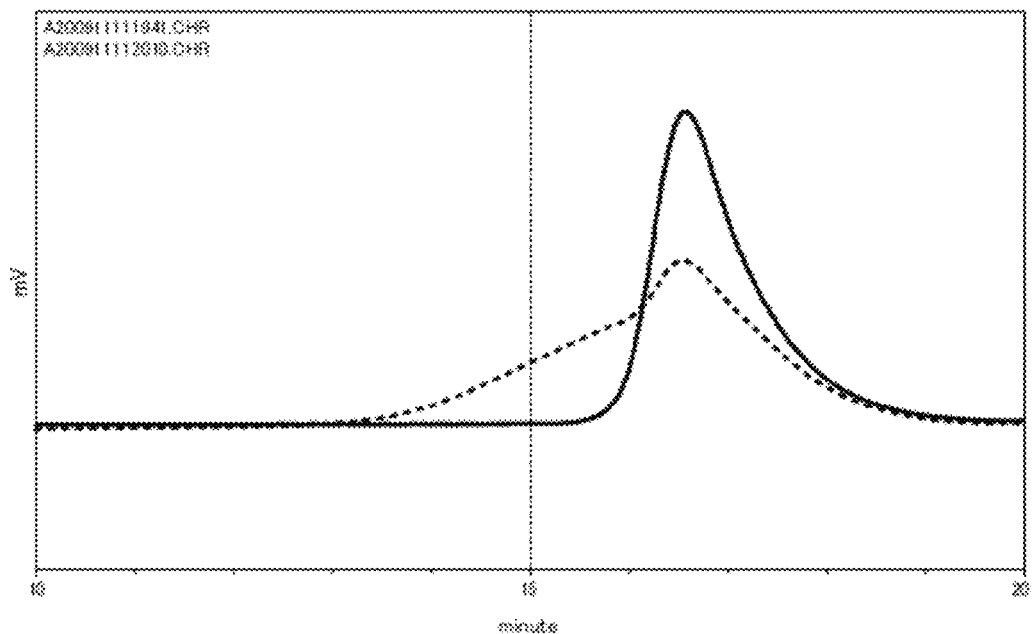
FIG. 1 shows GPC charts of ASB-1 both before and after hydrolysis.

The present invention will hereinafter be described in further detail based on preferred embodiments of the present invention.

The present invention provides the alkoxysilyl-containing A-B block copolymer having the characteristic structure composed of the (meth)acrylate monomers, and the A chain and B chain which make up the polymer are defined as will be described below. Described specifically, the A chain is a polymer block required to have a number average molecular weight of from 1,000 to 50,000 and a molecular weight distribution of not greater than 1.6, and the A chain is soluble in or miscible or compatible with a dispersion medium. On the other hand, the B chain is an alkoxysilyl-containing block copolymer comprising, as constituent monomer units, methacrylate units each having an alkoxysilyl group as a reactive group. It is to be noted that the above-described number average molecular weight means a number average molecular weight measured by gel permeation chromatography (hereinafter abbreviated as "GPC"), and may be called "Mn" hereinafter. On the other hand, the molecular weight distribution means a polydispersity index represented by Mw/Mn, and may be called "PDI" hereinafter. Mw represents a weight average molecular weight.

More preferably, the alkoxysilyl-containing A-B block copolymer may be constructed as will be described below. Described specifically, for first making the molecular weight distribution narrower, methacrylate monomers are selected as all the monomers that form the A-B block copolymer according to the present invention. Further, alkoxysilyl groups are controlled to locally concentrate on the B chain, and the molecular weight of the polymer block of B chain is set preferably at 5,000 or lower. In this manner, it is possible to provide an alkoxysilyl-containing block copolymer which, when used for the surface treatment of a pigment, can prevent a reaction between pigment particles and can achieve good pigment treatment. It is to be noted that the foregoing expression "the molecular weight of the polymer block of B chain" means the difference obtained by subtracting the Mn value of the A chain from the Mn value of the A-B block copolymer.

As a particularly preferred embodiment of the A-B block copolymer of the present invention upon its use in a water-based medium, the following one can be mentioned. Specifically, this is an alkoxysilyl-containing block copolymer having a polymer block of A chain, which to provide miscibility with water and solubility in water, has been obtained by copolymerizing a carboxyl-containing (meth)acrylate, has an acid value of from 50 to 250 mgKOH/g, and is miscible with water when neutralized.

Further, the block copolymer according to the present invention can be obtained by the living radical polymerization, which was developed by the present inventors and can be conveniently conducted with ease, instead of the conventional living radical polymerization as described above. Described specifically, the living radical polymerization is significantly characterized in the use of at least an iodine compound as an initiator compound. Preferably, any compound selected from phosphorus compounds, nitrogen compounds, oxygen compounds and carbon compounds, which can extract the iodine atom from the above-described iodine compound, may be used as a catalyst. More specifically, the catalyst may be selected from the compounds to be listed below. As phosphorus compounds, phosphorus halides, phosphite compounds and phosphinate compounds can be mentioned. As nitrogen compounds, imides, hydantoins, barbituric acids and cyanuric acids can be mentioned. As oxygen compounds, phenolic compounds, iodoxyphenyl compounds and vitamins can be mentioned. As carbon compounds, diphenylmethane compounds, cyclopentadienes and acetoacetyl compounds can be mentioned.

The alkoxysilyl-containing block copolymer according to the present invention obtained as described above is very useful as a material for resin-treating conventionally-known, various pigments or organic pigments and inorganic pigments treated at surfaces thereof with inorganic compounds, all of which may hereinafter be called simply "pigments". Described specifically, the alkoxysilyl groups in the B-chain of the block copolymer according to the present invention may be subjected to self-condensation to encapsulate pigment particles or may be reacted and bonded to the surfaces of pigment particles, whereby a resin-treated pigment of good quality can be easily obtained. In other words, the resin-treated pigment so obtained is excellent in dispersibility. The mass ratio of the pigment to the alkoxysilyl-containing block copolymer in this application may be set preferably at from 40/60 to 99/1, more preferably at from 50/50 to 95/5.

Especially in the case of inorganic pigments, the inorganic pigments to be treated with the block copolymer according to the present invention may preferably be those surface-treated with titanium oxide, zinc oxide, and/or an inorganic compound thereof.

In the present invention, the use of the pigment resin-treated as described above can provide an excellent pigment dispersion with the resin-treated pigment dispersed in a dispersion medium such as water, an organic solvent or a resin. Further, a water-based pigment dispersion in which a pigment is dispersed in a dispersion medium containing at least water can be obtained by treating the pigment with the alkoxysilyl-containing block copolymer of the form that carboxyl groups have been introduced in the A chain of the block copolymer, and neutralizing the thus-treated pigment with an alkaline material. In addition, the resin-treated pigment treated with the alkoxysilyl-containing block copolymer according to the present invention can be dispersed well not only in the above-described dispersion medium but also resins such as thermoplastic polymers or thermosetting plastics, and therefore, can also be provided as a colorant for plastics.

The alkoxysilyl-containing block copolymer according to the present invention is an A-B block copolymer the constituent monomers of which are all (meth)acrylate monomers. As mentioned above, the polymer block of A chain, which constitutes the block copolymer, is required to have a number average molecular weight of from 1,000 to 50,000 and a molecular weight distribution of not greater than 1.6. On the other hand, the polymer block of B chain is required to comprise, as constituent monomer units, methacrylate units each having at least an alkoxysilyl group. Further, the A-B block copolymer formed of these A chain and B chain is constructed as a whole to have a molecular weight distribution of not greater than 1.6. A description will hereinafter be made about the constituent monomer units and the like of the alkoxysilyl-containing block copolymer according to the present invention.

First, a description will be made about the polymer block of A chain. The monomer that constitutes the polymer block of A chain is a (meth)acrylate monomer. As this monomer, conventionally-known (meth)acrylate monomers such as those to be described below are each usable.

Examples include aliphatic, alicyclic and aromatic alkyl (meth)acrylates such as methyl (meth)acrylate, ethyl (meth)acrylate, propyl (meth)acrylate, isopropyl (meth)acrylate, butyl (meth)acrylate, 2-methylpropane (meth)acrylate, t-butyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth)acrylate, cyclohexyl (meth)acrylate, t-butylcyclohexylmethyl (meth)acrylate, isoboronyl (meth)acrylate, 2,2,4-trimethylcyclohexyl (meth)acrylate, cyclodecyl (meth)acrylate, cyclodecylmethyl (meth)acrylate, benzyl (meth)acrylate, phenyl (meth)acrylate, naphthyl (meth)acrylate, and allyl (meth)acrylate can be mentioned.

As monomers containing one or more hydroxyl groups, alkylene glycol mono(meth)acrylates such as 2-hydroxyethyl(meth)acrylate, 2-hydroxypropyl (meth)acrylate, 3-hydroxypropyl(meth)acrylate, and 4-hydroxybutyl(meth)acrylate can be mentioned. Because the use of such a monomer allows the hydroxyl groups, which are contained in the structure of the A chain, to react with the alkoxysilyl groups contained in the B chain and the polymer block of A chain and the alkoxysilyl groups in the B chain react with each other between the molecular chains, there is a possibility that gelation may be induced. Even when gelled, the alkoxysilyl-containing block copolymer available from the above-described reaction is still usable for treating pigments in the present invention, because it is hydrolyzed with water into a silanol. Moreover, it is considered possible to prevent gelation by adequately choosing conditions for the reaction.

As monomers having one or more polyglycol groups, examples include the following monomers: polyalkylene glycol mono(meth)acrylates such as polyethylene glycol mono(meth)acrylate, polypropylene glycol mono(meth)acrylate, polytetramethylene glycol mono(meth)acrylate, the mono(meth)acrylate of a mono - or polyethylene glycol-mono- or polypropylene glycol random copolymer, and the mono(meth)acrylate of a mono - or polyethylene glycol-mono- or polypropylene glycol block copolymer. It is to be noted that the words "poly" in the foregoing description all mean n=2 or greater.

Further, the mono(meth)acrylates of (polyalkylene)glycol monoalkyl, alkylene, alkyne ethers or esters, such as (poly)ethylene glycol monomethyl ether(meth)acrylate, (poly)ethylene glycol monooctyl ether(meth)acrylate, (poly)ethylene glycol monostearate ester(meth)acrylate, (poly)ethylene glycol monononylphenyl ether(meth)acrylate, (poly)propylene glycol monomethyl ether(meth)acrylate, and (poly)ethylene glycol (poly)propylene glycol monomethyl ether (meth)acrylate can be mentioned. It is to be noted that the words "poly" in the foregoing description all mean n=2 or greater.

Next, as monomers having an amino group, examples include the following monomers: 2-aminoethyl (meth)acrylate, t-butylaminoethyl(meth)acrylate, tetramethylpiperidyl (meth)acrylate, dimethylaminoethyl (meth)acrylate, diethylaminoethyl (meth)acrylate, pentamethylpiperidyl (meth)acrylate, N-ethylmorpholine (meth)acrylate, chlorotrimethylaminoethyl (meth)acrylate, chlorodiethylmethylaminoethyl (meth)acrylate, chlorobenzyldimethylaminoethyl (meth)acrylate, trimethylaminoethyl (meth)acrylate methyl sulfate, and the like.

As oxygen-containing monomers, examples include tetrahydrofurfuryl(meth)acrylate, morpholine(meth)acrylate, methylmorpholine(meth)acrylate, methylmorpholinoethyl (meth)acrylate, acetoacetylethyl(meth)acrylate, and the like.

As nitrogen-containing monomers, examples include (meth)acryloyloxyethyl isocyanate, (meth)acryloyloxyethoxyethyl isocyanate, blocked isocyanate-containing (meth)acrylates obtained by blocking these isocyanates with caprolactone or the like, and the like.

In addition, as other monomers, examples include the following monomers; polyester-type mono(meth)acrylate esters obtained by subjecting lactones such as ε-caprolactone and γ-butyrolactone to ring-opening polymerization while using, as initiators, the above-described (poly)alkylene glycol mono(meth)acrylate esters such as (meth)acryloyloxyethyl mono - or poly(n≥2)caplolactone; ester-type (meth)acrylates obtained by reacting dibasic acids to the above-described (poly)alkylene glycol mono(meth)acrylate esters such as 2-(meth)acryloyloxyethyl-2-hydroxyethyl phthalate and 2-(meth)acryloyloxyethyl-2-hydroxyethyl succinate to half-esterify the dibasic acids and then reacting alcohols or alkylene glycols to the other carboxyl groups; the mono(meth)acrylates of polyfunctional hydroxyl compounds having 3 or more hydroxyl groups, such as glycerol mono(meth)acrylate and dimethylolpropane mono(meth)acrylate); halogen-containing (meth)acrylates such as 3-chloro-2-hydroxypropyl (meth)acrylate, octafluorooctyl (meth)acrylate and tetrafluoroethyl (meth)acrylate; UV-absorbing monomers such as 2-(4-benzoxy-3-hydroxyphenoxy)ethyl (meth)acrylate and 2-(2'-hydroxy-5-(meth)acryloyloxyethylphenyl)-2H-be nzotriazole, said UV-absorbing monomers being particularly suited for copolymerization in providing dyes with improved light resistance; and macromonomers obtained by introducing (meth)acryloyloxy groups to the ends of polysilicones or polystyrene.

To the carboxyl groups or hydroxyl groups in the A chain formed from such a monomer as listed above, a monomer having a reactive group such as an addition-polymerizable group may be reacted to provide the polymer with addition-polymerizable groups in side chains thereof. Although not particularly limited, methacrylic groups can be introduced, for example, into a block polymer, which contains the A block and has been obtained by polymerizing (meth)acrylic acid as a copolymerization component, by reacting glycidyl methacrylate to the block polymer, or acrylic groups can be introduced into a block polymer, which has been obtained by polymerizing 2-hydroxyethyl(meth)acrylate as a copolymerization monomer component and has hydroxyl groups, by reacting acryloyloxyethyl isocyanate to the block polymer. When constructed as described above, the block copolymer having the addition polymerizable groups in the side chains thereof can be provided as a UV-curable or ER-curable polymer.

To provide the A chain with water dispersibility or water solubility, a monomer containing at least one carboxyl group is introduced as a component for the formation of the A chain. As monomer containing at least one carboxyl group and usable upon formation of the A chain, the following monomers can be mentioned. Examples include monomers obtained by reacting maleic anhydride, succinic anhydride or phthalic anhydride with acrylic acid, acrylic acid dimer, methacrylic acid, and hydroxyalkyl(meth)acrylates such as 2-hydroxyethyl (meth)acrylate and 4-hydroxybutyl (meth)acrylate.

The polymerization method used in the production process of the present invention for the alkoxysilyl-containing block copolymer is significantly characterized in that a monomer with an acid group contained therein can be used as it is. Nonetheless, with the acid group being protected as needed, a block polymer may be obtained, followed by removal of protecting groups to regenerate the acid groups.

In this case, conventionally-known monomers such as those to be mentioned below can be used. For example, a hemiacetal(meth)acrylate such as methyl (meth)acrylate, t-butyl (meth)acrylate, benzyl (meth)acrylate or 1-n-propoxyethyl (meth)acrylate can be deprotected to the corresponding (meth)acrylic acid after polymerization.

Further, a (meth)acrylate containing a sulfonic group or phosphoric group may also be used as needed. As a monomer containing a sulfonic group, sulfoethyl(meth)acrylate can be mentioned. As a monomer containing a phosphoric group, methacryloyloxyethyl phosphate or the like can be mentioned.

In the present invention, the acid value based on the carboxyl groups contained in the polymer block of A chain may preferably be from 50 to 250 mgKOH/g. More preferably, the polymer block of A chain may be constructed to have an acid value of from 60 to 200 mgKOH/g or so. An acid value of smaller than 50 mgKOH/g results in an inferior water solubility, while an acid value of greater than 250 mgKOH/g may lead to inferior waterproofness when the resulting block copolymer is applied to an article.

Upon using the block copolymer according to the present invention, the block copolymer may be used as it is without neutralizing the carboxyl groups contained in its structure, or the acid groups may be neutralized to provide the block copolymer with water solubility. No particular limitation is imposed on the alkaline material for neutralizing the carboxyl groups. Usable examples include ammonia, amines such as diethanolamine, triethylamine, diethanolamine and triisopropanolamine; the end amines of polyalkylene glycols; lithium hydroxide, sodium hydroxide, potassium hydroxide, sodium carbonate, calcium hydroxide; alkali metal salts such as zinc hydroxide; and the like.

The number average molecular weight of the polymer block of A chain, which constitutes the block copolymer according to the present invention, is from 1,000 to 50,000 as measured by GPC. If the number average molecular weight is lower than 1,000, the development of miscibility with a dispersion medium is observed, but the miscibility is insufficient, steric hindrance that serves to provide dispersion stability does not occur, and hence, no stable dispersion can be obtained. If the number average molecular weight exceeds 50,000, on the other hand, repulsion caused by steric hindrance occurs, but it is considered that dispersion stability may not be achieved due to entanglement of polymer chains or polymer chains may be available too few for each particle to achieve dispersion stability.

Although the block copolymer according to the present invention can be easily obtained by the novel living radical polymerization as described above, the PDI of the A chain shall be controlled to 1.6 or smaller. By making molecular weight uniform as mentioned above, the block copolymer can afford a good dispersion, and moreover, the molecular weight of the polymer block of B chain is considered to uniformly increase upon allowing the B chain to grow.

A description will next be made about the polymer block of B chain that constitutes the block copolymer according to the present invention. This polymer block of B chain contains at least methacrylate units, each of which has a reactable alkoxysilyl group, as constituent monomer units.

As an alkoxysilyl-containing methacrylate, conventionally-known methacrylates monomers such as those to be described below can be used. Illustrative are 3-methacryloxypropylmethyldimethylsilane, 3-methacryloxypropyltrimethoxysilane, 3-methacryloxypropylmethyldiethoxysilane, 3-methacryloxypropyltriethoxysilane, and the like. In addition, it is also possible to use monomers, each of which contains a reactive group, such as glycidyl (meth)acrylate and (meth)acryloxyethyl isocyanate in combination with amino-containing silane coupling agents. For example, alkoxysilyl-containing methacrylates, which can be obtained by reacting N-2-(aminoethyl)-3-aminopropylmethyldimethoxysilane or 3-aminopropylmethoxysilane with such monomers, may also be used. Moreover, alkoxysilyl-containing methacrylates, which can be obtained by reacting a glycidyl-containing silane coupling agent such as 2-(3,4-epoxycylohexyl)ethyltrimethoxysilane or 3-glydoxypropyltriethoxysilane with the above-described amino-containing silane coupling agents, may also be used.

Similarly, the above-described monomer containing at least one isocyanate, glycidyl or carboxyl group may be used as a monomer for the B chain to obtain an A-B block copolymer, and in addition, the above-described silane coupling agent having a group reactable with the isocyanate, glycidyl or carboxyl group may be reacted. In this case, it is necessary to avoid using the monomer, which contains at least one isocyanate, glycidyl or carboxyl group, for the A chain.

The polymer block of B chain may be formed as a copolymer by using, in addition to the above-described alkoxysilyl-containing monomer, at lest one of the above-described (meth)acrylates.

The molecular weight of the polymer block of B chain is indicated by a value obtained by subtracting the number average molecular weight of the polymer block of A chain from the number average molecular weight of the resultant, whole block copolymer. In the present invention, this molecular weight may preferably be 5,000 or lower. As a reason for this, a molecular weight of higher than 5,000 is so high that a reaction may take place between the particles themselves of the inorganic pigment. By controlling the molecular weight at 5,000 or lower to locally concentrate alkoxysilyl groups, the block copolymer is assured to react to every pigment particle.

The content of the alkoxysilyl-containing monomer units in the polymer block of B chain is not particularly limited, but may preferably be controlled to 50% or lower, or further to 30% or lower.

The monomers for use in the block copolymer according to the present invention are (meth)acrylates, and more preferably, are all methacrylates, because in the polymerization method to be employed in the present invention, the use of methacrylates as raw materials provides the resulting block copolymer with a narrower molecular weight distribution, that is, with a better blocking efficiency. The use of methacrylates as raw materials is considered to contribute to the stability of end iodine atoms. This stability is important for the polymerization method in the present invention.

The block copolymer according to the present invention can be easily obtained by the living radical polymerization developed by the present inventors. Described specifically, the block copolymer can desirably be synthesized by the living radical polymerization, which uses as an initiator compound at least an iodine compound and as a catalyst a compound that can extract the iodine atom from the iodine compound. More specifically, the living radical polymerization uses, as a catalyst, any one of phosphorus compounds selected from phosphorus halides, phosphite compounds, phosphinate compounds and the like, nitrogen compounds selected from imides, hydantoins, barbituric acids, cyanuric acids and the like, oxygen compounds selected from phenolic compounds, iodoxyphenyl compounds and vitamins, and carbon compounds selected from diphenylmethane compounds, cyclopentadienes, acetoacetyl compounds and the like.

The above-described polymerization method to be conducted in the present invention is a novel living radical polymerization which has been found by the present inventors and is different from the radical polymerization or living radical polymerization conducted to date. Described specifically, different from the conventional living radical polymerization method, the living radical polymerization to be conducted in the present invention uses neither a metal compound nor a ligand, and does not need using a special compound such as a nitroxide compound, dithiocarboxylate ester or xanthate compound. This living radical polymerization can be readily conducted by simply using an organoiodide compound as an initiator compound, preferably in combination with a catalyst in the conventionally-known radical polymerization that uses addition-polymerizable monomers and a radical generator as a polymerization initiator.

The above-described novel living radical polymerization method proceeds through a reaction mechanism represented by the below-described reaction formula, and is a reversible activation reaction of a dormant species, Polymer-X (P—X), into a propagating radical. Although this polymerization mechanism may vary depending on the kind of a catalyst to be used, the polymerization mechanism is considered to proceed as will be described next. In the reaction formula (1), P. generated from the polymerization initiator reacts to XA to form a catalyst radical A. in situ. A. acts as an activator for P—X, and owing to its catalytic effect, P—X is activated at high frequency.

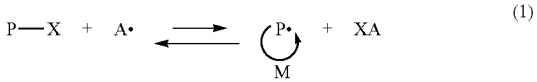

(X: I, A: P, N, O or C)

Described more specifically, a free radical generated from the polymerization initiator in the presence of the initiator compound with iodine (X) bonded thereto extracts an active hydrogen or active halogen atom from the catalyst to form a catalyst radical A.. This A. then extracts X from the initiator compound to form XA. The initiator compound, therefore, becomes a radical, to which a monomer polymerizes so that X is immediately extracted from XA to prevent any termination reaction. Under heat or the like, A. extracts X from the end X to form XA and an end radical. To this end radical, the monomer reacts so that X is immediately given to the end radical to stabilize the end radical. Through repetition of the above-described reaction, the polymerization proceeds to permit control of the molecular weight and structure. It is, however, to be noted that the above-described polymerization method may be accompanied by a bimolecular termination reaction or disproportionation as a side reaction in some instances.

A description will be made about the individual components to be used in the living radical polymerization which is to be conducted in the present invention. The initiator compound, which initiates living radical polymerization, can be a conventionally-known organoiodide compound, and is not specifically limited. Specifically exemplifying the initiator compound for use in the present invention, the following compounds can be mentioned, for example: alkyl iodides such as methyl iodide, t-butyl iodide, 2-iodo-1-phenylethane, 1-iodo-1-phenylethane, 1-iodo-1,1-diphenylethane and diiodomethane; iodine-containing organohalide compounds such as iodotrichloromethane and iododibromomethane; iodoalcohols such as 2-iodopropanol, 2-iodo-2-propanol, 2-iodo-2-methylpropanol and 2-phenyl-1-iodoethanol; ester compounds of these iodoalcohols with carboxylic compounds such as acetic acid, butyric acid and fumaric acid; iodocarboxylic acids such as iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid and β-iodo-β-phenylpropionic acid; esterified compounds of these iodocarboxylic acids with methanol, ethanol, phenol, benzyl alcohol and the above-described iodoalcohols; anhydrides of these iodocarboxylic acids; acid anhydrides such as the chlorides and bromides of these iodocarboxylic acids; cyano-containing iodides such as iodoacetonitrile, 2-cyano-2-iodopropane, 2-cyano-2-iodobutane, 1-cyano-1-iodocyclohexane and 2-cyano-2-iodovaleronitrile; and the like.

As these compounds, their commercial products can be used as they are. They can also be produced by conventionally-known processes. They can be obtained, for example, through reactions of azo compounds such as azobisisobutyronitrile with iodine, or by subjecting organohalide compounds, which are similar to the above-described organoiodide compounds except for the substitution of their iodine atoms with other halogen atoms such as bromine or chlorine atoms, to halogen exchange reactions with iodide salts such as quaternary ammonium iodide and sodium iodide. It is to be noted that no particular limitation is imposed on their production processes.

In particular, the reaction between an azo compound and iodine does not need to synthesize an initiator compound beforehand. By adding iodine and the azo compound upon polymerization and conducting the polymerization, an initiator compound is formed in situ so that the polymerization proceeds. Therefore, the reaction between the azo compound and iodine is very easy and is preferred.

The catalyst for use in the present invention extracts the iodine atom from the above-described initiating compound to form a radical. Usable examples include organic phosphorus compounds, organic nitrogen compounds, organic oxygen compounds, organic compounds containing an active carbon atom, and the like. The phosphorus compounds include iodine-containing phosphorus halides, phosphite compounds and phosphinate compounds. The nitrogen compounds include imide compounds and hydantoin compounds. The oxygen compounds include phenolic compounds, iodoxyphenyl compounds and vitamins. The organic compounds, which contain an active carbon atom, include organic compounds such as cyclohexadiene, diphenylmethane and acetoacetyl compounds. In the present invention, one or more of these compounds can be selected.

These compounds are not particularly limited, and will be specifically exemplified hereinafter. As the phosphorus compounds, iodine-containing phosphorus halides, phosphite compounds and phosphinate compounds can be used as described above. Examples of such phosphorus compounds include phosphorus triiodide, dimethyl phosphite, diethyl phosphite, dibutyl phosphite, diphenyl phosphite, dibenzyl phosphite, bis(2-ethylhexyl)phosphite, ethoxyphenyl phosphinate, phenylphenoxy phosphinate, ethoxymethyl phosphinate, phenoxymethyl phosphinate, and the like.

As the nitrogen compounds, there are imide compounds and hydantoin compounds. Examples include succinimide, 2,2-dimethylsuccinimide, α,α-dimethyl-β-methylsuccinimide, 3-ethyl-3-methyl-2,5-pyrrolidinedione, cis-1,2,3,6-tetrahydrophthalimide, α-methyl-α-propylsuccinimide, 5-methylhexahydroisoindol-1,3-dione, 2-phenylsuccinimide, α-methyl-α-phenylsuccinimide, 2,3-diacetoxysuccinimide, maleimide, phthalimide, 4-methylphthalimide, 4-nitrophthalimide, N-chlorosuccinimide, N-bromosuccinimide, N-iodosuccinimide, hydantoin, diiodohydantoin, and the like.

As the oxygen compounds, phenolic compounds each of which has a hydroxyl group (phenolic hydroxyl group) bonded to an aromatic ring, iodoxyphenyl compounds as iodides of the phenolic hydroxyl groups, and vitamins. Examples of the phenolic compounds include phenol, hydroquinone, methoxyhydroquinone, t-butylphenol, t-butylmethylphenol, catechol, resorcinol, di-t-butylhydroxytoluene, dimethylphenol, trimethylphenol, di-t-butylmethoxyphenol, polymer obtained by polymerizing hydroxystyrene, hydroxyphenyl-carrying microparticles of the polymer, and the like. As these compounds are incorporated as polymerization inhibitors for the preservation of monomers, catalytic effects can also be exhibited by using commercially-available monomers as they are without purification. The iodoxyphenyl compounds include thymol diiodide and the like, and the vitamins include vitamin C, vitamin E and the like As the organic compounds with an active carbon atom contained therein, cyclohexadiene, diphenylmethane, acetylacetone and the like can be mentioned.

The amount of the above-described catalyst is less than the number of moles of the polymerization initiator. An excessively large number of moles results in overcontrol of the polymerization so that the polymerization does not proceed.

Next, as the polymerization initiator (which may also be called "the radical generator") for use in the present invention, a conventionally-known polymerization initiator can be used. No particular limitation is imposed on it, and commonly-employed organic peroxides and azo compounds can be used. Specific examples include benzoyl peroxide, dicumyl peroxide, di-t-butyl peroxide, t-butylperoxybenzoate, t-hexyl peroxybenzoate, t-butyl peroxy-2-ethylhexanoate, t-hexyl peroxy-2-ethylhexanoate, 1,1-bis(t-butylperoxy)-3,3,5-trimethylcyclohexane, 2,5-dimethyl-2,5-bis(t-butylperoxy)hexyl-3,3-isopro pylhydroperoxide, t-butyl hydroperoxide, dicumyl hydroperoxide, acetyl peroxide, bis(4-t-butylcyclohexyl)peroxydicarbonate, isobutyl peroxide, 3,3,5-trimethylhexanoyl peroxide, lauryl peroxide, 1,1-bis(t-butylperoxy)-3,3,5-trimethylcyclohexane, 1,1-bis(t-hexylperoxy)-3,3,5-trimethylcyclohexane, 2,2'-azobis(isobutyronitrile), 2,2'-azobis(2,4-dimethylvaleronitrile), 2,2'-azobis(isobutyrate), 2,2'-azobis(methoxydimethylvaleronitrile) and the like.

The polymerization initiator can be used as much as preferably from 0.001 to 0.1 molar times, more preferably from 0.002 to 0.05 molar times the number of moles of the monomer, because an unduly small use amount of the initiator results in insufficient polymerization while an excessively large use amount of the initiator has a potential problem that a polymer of the addition-polymerizable monomer alone may be formed.

By using at least the organoiodide as an initiator compound, the addition-polymerizable monomers, the polymerization initiator and the catalyst and conducting polymerization as described above, the acrylic polymer, for example, the block copolymer according to the present invention can be obtained. The polymerization may be conducted in bulk without using any organic solvent, but solution polymerization that uses a solvent is preferred. No particular limitation is imposed on the organic solvent to be used. Examples include the following ones:

hydrocarbon solvents such as hexane, octane, decane, isodecane, cyclohexane, methylcyclohexane, toluene, xylene, and ethylbenzene;

alcohol solvents such as methanol, ethanol, propanol, isopropanol, butanol, isobutanol, hexanol, benzyl alcohol and cyclohexanol;

glycol solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, dipropylene glycol dimethyl ether, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate;

ether solvents such as diethyl ether, dipropyl ether, methyl cyclopropyl ether, tetrahydrofuran, dioxane, and anisole;

ketone solvents such as methyl ethyl ketone, diethyl ketone, isobutyl methyl ketone, cyclohexanone, isophorone, and acetophenones;

ester solvents such as methyl acetate, ethyl acetate, butyl acetate, propyl acetate, methyl butyrate, ethyl butyrate, caprolactone, methyl lactate, and ethyl lactate;

halogenated solvents such as chloroform and dichloroethane;

amide solvents such as dimethylformamide, dimethylacetamide, pyrrolidone, N-methylpyrrolidone, and caprolactam; and dimethyl sulfoxide, sulfolane, tetramethylurea, ethylene carbonate, propylene carbonate, dimethyl carbonate, and the like. These solvents are used either as a single system consisting of one of them or as a mixed solvent consisting of two or more of them. Any organic solvent can be used in the present invention insofar as it can dissolve the initiator compound in the form of the organoiodide, the catalyst, the addition-polymerizable monomers and the polymerization initiator to be used in the production process according to the present invention.

The solid content (monomer concentration) in the polymerization mixture obtained by the method as described above may be preferably from 5 to 80 mass %, with from 20 to 60 mass % being more preferred, although no particular limitation is imposed thereon. If the solid content is lower than 5 mass %, the monomer concentration is so low that the polymerization may not be brought to completion. On the other hand, polymerization at a solid content of higher than 80 mass % or bulk polymerization may lead to a polymerization mixture having unduly high viscosity, and hence, to a potential problem that stirring may become difficult or the polymerization yield may be reduced.

The polymerization temperature is not particularly limited, and may be preferably from 0° C. to 150° C., more preferably from 30° C. to 120° C. The polymerization temperature should be adjusted depending on the half-life of each polymerization initiator. Although it is preferred to continue the polymerization until the monomers are used up, the polymerization time is not particularly limited and may be, for example, from 0.5 hour to 48 hours, and as a practical time, preferably from 1 hour to 24 hours, more preferably from 2 hours to 12 hours.

The polymerization atmosphere is not particularly limited, and the polymerization may be conducted in air. In other words, oxygen may exist in a usual range in the system, or if necessary, the polymerization may be conducted under a nitrogen stream to eliminate oxygen. As the materials to be used in the polymerization, commercial products can be used as they are although impurities may be removed by distillation or with activated carbon or alumina. Further, the polymerization may be conducted under shading, but no problem arises even when the polymerization is conducted in a transparent vessel such as a glass vessel.

By using at least the organoiodide as an initiator compound, the addition-polymerizable monomers, the polymerization initiator and the catalyst and conducting polymerization as described above, the block copolymer of the present invention can be obtained.

Amore detailed description will now be made about the process of the present invention, to which the above-described method is applied, for the polymerization of the block copolymer. In the polymerization of the block copolymer by the polymerization process of the present invention, a monomer, which is to constitute the polymer block of A chain, is polymerized using a monofunctional organoiodide as an initiator compound. The polymer obtained as described above is stable because it has been substituted at an end thereof with an iodine atom. Another monomer is next added, and by dissociating the iodine atom under heat or the like, polymerization can be initiated again. A block copolymer of desired structure can be obtained accordingly.

What is particularly important in the present invention is to contain no alkoxysilyl groups in the polymer block of A chain which is equipped with miscibility with the dispersion medium. For this purpose, it is necessary to prepare one of the polymer blocks, i.e., the B chain in a first step by using an alkoxysilyl-containing (meth)acrylate and, if necessary, in combination with another monomer and also to bring the first-step polymerization into completion before adding and polymerizing a monomer to constitute the other one of the polymer blocks, i.e., the A chain that is miscible with the dispersion medium. It is, therefore, important to ascertain the completion of the first-step polymerization when the polymerization conducted in the above-described manner, but the completion of the first-step polymerization is hardly ascertainable. Otherwise, it is necessary to conduct purification subsequent to the polymerization such that no alkoxysilyl groups would remain in the A chain. However, purification is not very preferred because alkoxysilyl groups may undergo self-condensation through a side reaction.

As a preferred process for obtaining the block copolymer according to the present invention, it is, therefore, preferred to polymerize the monomer for the polymer block of A chain soluble in the dispersion medium and, even if the polymerization has not been brought to completion, then to add the alkoxysilyl-containing monomer to obtain the alkoxysilyl-containing polymer block as the B chain.

Moreover, the monomer for the polymer block of A chain does not require complete polymerization insofar as the polymer block of B chain is provided with the above-described molecular weight. Accordingly, the monomer for the polymer block of B chain may be added and polymerized at the time point that the polymerization degree of the monomer for the polymer bock of A chain has reached preferably 50% or higher, more preferably 80% or higher. The addition of the monomer for the polymer block of B chain can be made at once, or can be made dropwise by a dropping device. Dropwise addition makes it possible to impart a gradient to the concentration of the monomer in the polymer block of B chain, that is, to provide a gradient polymer.

In the polymerization to be used in the present invention, the molecular weight of the resulting polymer can be controlled depending on the amount of the initiator compound. Described specifically, by setting the number of moles of each monomer relative to the number of moles of the initiator compound, the resulting polymer can be controlled to a desired molecular weight or the magnitude of its molecular weight can be controlled. When 500 moles of a monomer having a molecular weight of 100 are used and polymerized by using 1 mole of the initiator compound, for example, the molecular weight is calculated to be 1×100× 500=50,000. Namely, a preset molecular weight can be calculated by the following formula:

Initiating compound 1 mole ×the molecular weight of a monomer ×the molar ratio of the monomer to the initiator compound In some instances, however, the polymerization method to be used in the present invention may be accompanied by a side reaction such as bimolecular termination or disproportionation, so that the actual molecular weight may not be controlled to the above-described calculated molecular weight. Preferred is a polymer obtained without such a side reaction. Nonetheless, the polymer may have a greater molecular weight as a result of coupling or a smaller molecular weight as a result of termination. Further, the polymerization degree may not be required to be 100%. These variations do not lead to any practical problem in the technology of the present invention, because impurities such as polymers of low molecular weights and unreacted monomers can be eliminated upon obtaining a resin-treated pigment subsequent to encapsulation of a pigment through a reaction.

As an alternative, after the desired block polymer is obtained, the polymerization initiator and catalyst may be added further to polymerize any remaining monomers for the completion of the polymerization. Insofar as the block copolymer for use in the present invention has been formed or contained, no problem arises even if the individual block polymers are separately contained.

Iodine atoms are used in the present invention. Although these iodine atoms may be used in a bonded state, it is preferred to have them liberated beforehand from molecules to facilitate their removal. The liberation method can be a conventionally-known method, and no particular limitation is imposed thereon. These iodine atoms may be liberated by heating, may be liberated by adding an acid or alkali, or may be dissociated by adding sodium thiosulfate or the like. As the present invention includes a washing step in the treatment of the pigment, the iodine atoms can be removed in the washing step.

Upon storing the alkoxysilyl-containing block copolymer, no alkoxysilyl groups are lost through hydrolysis even when the polymerization mixture is stored as it is, provided that water does not penetrate from the outside. Nonetheless, the polymerization mixture may be stored with a dehydrating agent added therein as needed. Examples of the dehydrating agent include orthocarboxylate esters such as trimethyl orthoformate, triethyl orthoformate, trimethyl orthoacetate, trimethyl orthoacetate and tripropyl orthoacetate. To 100 mass % of the block copolymer, the dehydrating agent may be added preferably in from 0.1 to 30 mass %.

As a preferred characteristic feature of the present invention, it can be mentioned that the polymer block of B chain is controlled in the above-described molecular weight range and the alkoxysilyl groups are locally bonded on the polymer block of B chain. It is, therefore, characterized that no gelation takes place even when the alkoxysilyl groups in the B chain are hydrolyzed and the self-condensation of the alkoxysilyl groups occurs.

The block copolymer according to the present invention and its solution (resin solution) can be obtained as described above.

A description will next be made about the encapsulation of a pigment with the alkoxysilyl groups in the alkoxysilyl-containing block copolymer of the present invention easily available as described above, and also about the resulting resin-treated pigment.

As pigments usable in the present invention, conventionally-known organic pigments and inorganic pigments are both usable.

The organic pigments include, but are not limited to, soluble azo pigments, insoluble azo pigments, phthalocyanine pigments, quinacridone pigments, isoindolinone pigments, isoindoline pigments, perylene pigments, perinone pigments, dioxazine pigments, anthraquinone pigments, dianthraquinonyl pigments, anthrapyrimidine pigments, anthanthrone pigments, indanthrone pigments, flavanthrone pigments, pyranthrone pigments, diketopyrrolopyrrole pigments, and the like.

The inorganic pigments include, for example, white pigments such as rutile-type titanium oxide, anatase-type titanium oxide, brookite-type titanium oxide, and microparticulate titanium oxide, and if necessary, photocatalyst titanium oxide, zinc oxide, and zinc sulfide; clays such as barium sulfate, calcium carbonate, calcium sulfate, kaolin and white clay; silicon dioxides such as silica and diatomaceous earth; extender pigments such as talc, magnesium sulfate and alumina; inorganic color pigments and composite oxide pigments, such as ocher, titanium yellow, red iron oxide, ultramarine, Prussian blue, cobalt blue, cerulean blue, zinc green, emerald green, cobalt green, nickel/cobalt/zinc/titanium composite oxides, cobalt/chromium composite oxides, and copper/chromium/manganese composite oxides; fluorescent pigments such as strontium sulfide, zinc sulfide and tungsten calcium; glow pigments such as strontium aluminate; pearlescent pigments, that is, titanium-treated products of micas such as mica, muscovite, annite and phlogopite; powders of metals such as copper and aluminum, which give a lustrous sensation or metallic sensation; and in addition, glass powder, silicon carbide, silicon nitride, ferrite, and the like.

Each pigment for use in the present invention may be used as it is, or may be treated at surfaces thereof with an inorganic compound that can react with silanol groups derived from the alkoxysilyl groups. This treatment can be conducted by a conventionally-known method, examples of which include, but are not limited to, titania treatment, silica treatment, silica-alumina treatment, alumina treatment, zirconia treatment, aluminum alkanate treatment, silicone treatment, and the like. The treatment rate may preferably be from 5 to 30% based on the pigment.

Among the above-described inorganic pigments, the use of titanium oxide and zinc oxide, which are commonly used for applications such as colorants and ultraviolet absorptions, is particularly preferred in the present invention.

The content of the pigment in 100 mass % of the resin-treated pigment according to the present invention may be set preferably at from 40 mass % to 99.5 mass %, and in this range, can be adjusted depending on the application purpose of the resin-treated pigment.

A description will next be made about the treatment of pigment particle surfaces with the alkoxysilyl-containing block copolymer according to the present invention.

The reaction with the pigment particle surfaces or the reaction for the encapsulation in the present invention proceeds as will be described hereinafter. The alkoxysilyl groups in the structure of the block copolymer according to the present invention are converted with water to alcohol molecules and silanol groups. These silanol groups undergo either self-dehydrating condensation or dehydrating condensation with hydroxyl groups on the pigment surfaces or both, so that the silanol groups react with the functional groups on the pigment surfaces or undergo self-condensation to encapsulate the pigment.

Described specifically, the treatment in the present invention uses [1] a reaction method that encapsulates the pigment by self-crosslinking (condensation) of the alkoxysilyl groups in the B chain or [2] a reaction method that bonds the functional groups on the surfaces of pigment particles with the alkoxysilyl groups in the B chain.

A description will first be made about the reaction method [1]. In this case, the alkoxysilyl groups in the B chain separate as alcohol molecules with water, so that silanol groups are formed. Under heating, these silanol groups undergo dehydrating condensation and crosslinking to take a three-dimensional structure so that encapsulation is achieved. Owing to the crosslinked structure, the alkoxysilyl-containing block copolymer is not dissolved in the dispersion medium and remains encapsulating the pigment.

At this time, the encapsulation may be effected only with the alkoxysilyl-containing block copolymer according to the present invention, but a chlorosilane or an alkoxysilyl compound, that is, a low-molecular compound containing a dialkoxysilyl group or a higher alkoxysilyl group may also be used in combination to form a crosslinked structure by a sol-gel method. No particular limitation is imposed on the chlorosilane or alkoxysilyl compound used as a low-molecular compound in the above-described encapsulation. Examples include tetrachlorosilane, dimethyldimethoxysilane, trimethoxymethylsilane, n-hexyltriethoxysilane, hexamethyldisilazane, vinyltriethoxysilane, 3-aminopropyltriethoxysilane, and the like. The amount of the chlorosilane or alkoxysilyl compound is not particularly limited either, but may preferably be set at from 0 to 50% based on the alkoxysilyl-containing block copolymer according to the present invention.

According to the reaction method [2], the block copolymer according to the present invention bonds to the pigment particles through the dehydrating condensation reaction between active hydrogen-containing functional groups on the pigment particle surfaces, said active hydrogen-containing functional groups being reactable with the alkoxysilyl groups, preferably hydroxyl groups and the silanol groups formed by the hydrolysis of the alkoxysilyl groups. As a result of the bonding as described above, the block copolymer according to the present invention does not separate from the pigment into a dispersion medium when the resultant resin-treated pigment is dispersed in the dispersion medium. In this case, the self-condensation of the alkoxysilyl groups in the B chain may take place. As the reaction method [2] requires to bond the block copolymer according to the present invention to the pigment particles, it is preferred to avoid using the above-described low-molecular compound, that is, the chlorosilane or alkoxysilyl compound.

Using the reaction [1] or [2] or both the reactions [1] and [2] in combination, the pigment is encapsulated with the block copolymer according to the present invention. As a method for this encapsulation, a conventionally-known method can be adopted, and no particular limitation is imposed. As a dry method, for example, there is a method that, with an inorganic pigment being agitated in a tumbler, adds the block copolymer according to the present invention, followed by further agitation to make the block copolymer react to the surfaces of the inorganic pigment. As a wet method, on the other hand, there is a method that slurries or disperses an inorganic pigment in a liquid medium, followed by addition of the block copolymer according to the present invention to conduct a reaction. In both the dry and wet methods, a catalyst may be added to accelerate the reaction of the alkoxysilyl groups. Examples of the catalyst include tin compounds such as dibutyltin dilaurate, dibutyltin oxide and dibutyltin acetylacetonate; and titanium compounds such as isopropoxytitanium bis(acetylacetonate) and tetraisopropoxytitanium.

In this invention, the pigment can be mixed, stirred or dispersed in water, methanol or another organic solvent, and to the resultant mixture, the block copolymer of the present invention, preferably, its solution (resin solution) can be added to conduct the encapsulation reaction for the pigment. This method is preferred, because every pigment particle can be uniformly treated with very good accuracy. Particularly in this case, the block copolymer according to the present invention is required to be soluble in the liquid medium of the pigment mixture. Otherwise, the resin is caused to precipitate upon addition of the block copolymer, so that the reaction does not proceed well. No particular limitation is imposed on the liquid medium to which the block copolymer according to the present invention can be added, because the solubility of the block copolymer is relied upon.

There are also a method that upon conducting ultrafine grinding of a pigment, adds the block copolymer according to the present invention and kneads it together with the pigment to achieve the ultrafine grinding and encapsulation at the same time and a method that after ultrafine grinding, the block copolymer is added and kneaded to achieve encapsulation. These methods are both usable.

Describing the treatment method of the present invention more specifically, there are treatment in a water-based medium, treatment in an oil-based medium system, and treatment in a pigment kneading system.

A description will first be made about the treatment in the water-based medium. When conducting the treatment in the water-based medium, an alkoxysilyl-containing block copolymer according to the present invention in which groups having miscibility with the water-based medium, such as carboxyl groups or polyethylene glycol groups, are contained in the A chain can be preferably used so that the block copolymer dissolves in the water-based medium. When the A chain has carboxyl groups, their neutralization with water makes it possible to dissolve the resultant block copolymer in water. When the A chain has polyethylene glycol groups, on the other hand, the treatment needs to be conducted under heat. However, no precipitation shall occur at the cloud point by heating. It is, therefore, necessary to take the cloud point and the heating temperature into consideration.

The pigment and water or an organic solvent, which can be mixed with water, are combined, stirred and dispersed with the proportion of the pigment being set at preferably from 5 to 70 mass %, more preferably from 5 to 50 mass %. At this time, the block copolymer according to the present invention may be added to microdisperse the pigment.

To allow the block copolymer according to the present invention to react with the functional groups on the pigment surfaces, the block copolymer alone may be added. In the case of an organic pigment not treated with an inorganic compound, however, the pigment surfaces and the alkoxysilyl groups in the block copolymer cannot react with each other. To induce encapsulation through the dehydrating condensation of the block copolymer according to the present invention and to allow the encapsulation to proceed, the above-described low-molecular alkoxysilyl compound may be added preferably.

To disperse the block copolymer according to the present invention in a better state, a conventionally-known surfactant or high-molecular dispersant may also be used in combination as needed.

The above-described stirring, mixing and dispersion method can be a conventionally-known method. For example, a disper mixer, homogenizer, ultrasonic disperser, bead mill, ball mill, or a kneader such as a two-roll mill or three-roll mill can be used. The treatment by such a roll mill makes it possible to conduct the treat at a high pigment content. The pigment may be dispersed preferably to the primary particle size of the pigment by the mixing, stirring and dispersion, but may be allowed to aggregate to a needed particle size.

These mixing and stirring may be conducted in a range of from room temperature to 100° C., from room temperature to 90° C. being preferred. Upon dispersion, heating may be applied if the dispersion is feasible at elevated temperatures. Otherwise, it is preferred that subsequent to dispersion, the resulting dispersion is transferred to another container, followed by heating.

The pH at this time may be either acidic or alkaline, and preferably, may not be neutral, because the hydrolysis of alkoxysilyl groups is more accelerated to facilitate dehydrating condensation under acidic or alkaline conditions.

By the above-described heating, the alkoxysilyl groups which the block copolymer according to the present invention has react with water into silanol groups. These silanol groups then come to close to each other through hydrogen bonding so that further dehydrating condensation takes place. As a consequence, the reaction with the pigment particle surfaces, self-condensation in the block copolymer, and the dehydrating condensation between the block copolymer and the low-molecular alkoxysilyl compound are achieved. At this time, the dehydration condensation is not required to be complete, because it is sufficient if heating is conducted to make the dehydrating condensation complete upon drying the resulting pigment.

The resulting dispersion may then be filtered, as it is, after the treatment. However, this filtration may be hardly conducted because the treated pigment is in the form of fine particles. It is, therefore, preferred to precipitate the treated pigment. As the precipitation method, a conventionally-known method can be used. When the carboxyl groups have been neutralized, for example, the treated pigment is precipitated by adding an acidic substance. In the case of polyethylene glycol groups, heating is sufficiently conducted to induce precipitation by using the cloud point. Subsequently, the treated pigment is collected by filtration, and is thoroughly washed. If its silanol groups have undergone dehydrating condensation, the washed pigment can be used, as it is, as a paste. Preferably, the washed pigment may be dried to bring the dehydrating condensation to completion. The drying temperature is a temperature at which water can be eliminated, specifically 50° C. or higher, preferably from 70 to 120° C.

A description will next be made about the treatment in the oil-based medium. In this treatment, an organic solvent such as that described above is used, and a system of the organic solvent is heated to induce dehydrating condensation. The pigment and alkoxysilyl-containing block copolymer, and if necessary, the low-molecular alkoxysilyl compound are charged in the organic solvent. The pigment may be charged as it is. For encapsulating or reacting the pigment in a form similar to primary particles, however, it is possible to use a color prepared by combining and dispersing the organic solvent and alkoxysilyl-containing block copolymer, and if necessary, a pigment derivative and a pigment dispersant as additives.

The resulting liquid mixture is then mixed, stirred and dispersed, and the dispersion so formed is heated. The heating temperature may be 50° C. or higher, with from 70 to 150° C. being preferred. It is preferred to add a small amount of water, because the hydrolysis of the alkoxysilyl groups can be accelerated. By the heating, alkoxysilyl groups are converted to alcohol molecules and silanol groups. These silanol groups then undergo a dehydrating condensation reaction with the hydroxyl groups on the pigment surfaces, the silanol groups of the block copolymer, or the silanol as a hydrolysate of the low-molecular alkoxysilyl compound to coat the pigment.

The resulting mixture may be filtered as it is. As an alternative, the resulting mixture may be added to such a poor solvent that would precipitate the block copolymer, and subsequent to precipitation, may be filtered. After the filtration, the coated pigment is washed, and can be used as it is, that is, in the form of a paste. As an alternative, the coated pigment may be dried for the above-described reason, and may then be ground and used as a powder.

A description will next be made about the method that capsulates the block copolymer upon kneading it with the pigment. This method requires to adjust the particle size beforehand, because the pigment, especially the organic pigment is large in particle size after its synthesis. Especially upon conducting microparticulation, it is preferred to perform the microparticulation by kneading while using a medium such as an inorganic salt. The alkoxysilyl-containing block copolymer according to the present invention, and if necessary, the low-molecular alkoxysilyl compound are added during or after the kneading, and are subjected to dehydrating condensation and capsulation under heat applied during the kneading.

As an alternative, the removal of the inorganic salt as the medium is needed after the kneading. The removal is generally conducted by precipitating the inorganic salt in water. After the precipitation in water, the treated pigment is collected by filtration, and is then dried. As a consequence, the block copolymer is allowed to undergo dehydrating condensation to encapsulate the pigment.

No particular limitation is imposed on the kneading method. For example, however, kneading may be conducted at room temperature or under heat for from 30 minutes to 60 hours, preferably from 1 hour to 12 hours by a conventionally-known kneading machine such as a kneader, extruder, ball mill, two-roll mill, three-roll mill, or flusher. It is also preferred to make combined use of a carbonate salt, chloride salt or the like as an ultrafine medium to subject the pigment to ultrafine grinding in the mass under kneading as needed, and also, to make combined use of a viscous organic solvent such as glycerin, ethylene glycol or diethylene glycol to apply lubricity or the like as needed. The salt may be used in an amount as much as from 1 to 30 mass times, preferably from 2 to 20 mass times the pigment. The amount of the viscous organic solvent should be adjusted depending on the viscosity at the time of the kneading of the pigment. After desalting, the treated pigment may be used as a water paste, or may be ground for use as a powder.

By the method as described above, the pigment treated with the block copolymer according to the present invention can be obtained. A description will next be made about a pigment dispersion, in which such a resin-treated pigment is dispersed in one of water, an organic solvent or a resin, and its use.

As described above, the B chain in the A-B block copolymer according to the present invention contains alkoxysilyl groups, and in the resin-treated pigment according to the present invention, the polymer block of B chain capsulates the pigment, or reacts and bonds with functional groups or the like on the surfaces of the pigment. The other polymer block of A chain can function as a solvent-soluble chain, and does not react with the functional groups on the surfaces of the pigment. Owing to this solvent-soluble chain, the polymer block according to the present invention is miscible with a dispersion medium. As a result, the resin-treated pigment according to the present invention can be stably dispersed in the dispersion medium As the dispersion medium for use in dispersing the resin-treated pigment according to the present invention, a liquid medium, that is, water, an organic solvent or a liquid mixture thereof can be mentioned. As examples of the organic solvent, the above-mentioned organic solvents can be used. In addition, the above-described monomers, monofunctional monomers such as styrene and vinyl acetate, bifunctional and higher functional monomers, liquid resins, for example, polyethylene glycol and its (meth)acrylate, polybutadiene, and the like can be also used.

A solid medium can also be used. As the solid medium, a resin, specifically a conventionally-known thermoplastic resin or thermosetting resin can be used. Examples include polyolefin resins, polystyrene resin, polymethyl methacrylate resin, polyethylene terephthalate resin, polycarbonate resins, polyamide resins, and the like.

As a dispersion method in the medium, a conventionally-known method can be adopted. For a liquid medium, a kneader, attritor, ball mill, sand mill or medium-containing horizontal disperser making use of a glass medium, zircon medium or the like, colloid mill, ultrasonic disperser, high-pressure homogenizer, or the like can be used, for example. For a solid medium, on the other hand, a roll mill, extruder, kneader or the like can be mentioned.

The amount of the resin-treated pigment of the present invention to be added to a medium is not particularly limited, and can be adjusted depending on the application. Further, various additives can also be added as needed. Usable examples include durability improvers such as UV absorbers and antioxidants; antisettling agents; release agents and releasability improvers; fragrances, antibacterial agents and antimold agents; and plasticizers, antidrying agents, and the like. In addition, other dispersants, dispersion aids, pigment treatments, dyes, and the like can also be added as needed.

Especially for the dispersion in a water-based medium, the resin-treated pigment treated with the alkoxylsilyl-containing block copolymer of the present invention, which contains carboxyl groups in the A chain, may be dispersed preferably by ionizing the carboxyl groups with the above-described alkaline material.

The thus-obtained pigment dispersion in the liquid medium may be used as it is, but from the standpoint of providing the dispersion with higher reliability, it is preferred to remove, by a centrifuge, ultracentrifuge or filter, coarse particles which may exist a little.

These pigment dispersions are useful as colorants for applications to be described next. The above-described pigment dispersions are suited preferably as colorants for paints; as colorants for inks such as gravure inks, water-based flexographic inks, offset inks, inkjet inks, UV-curable inkjet inks and oil-based inkjet inks; colorants for coating formulations such as resists for color filters, UV or ER-curable coating formulations and back coating formulations; colorants for stationery colors; colorants for toners such as suspension polymerization toners, ground toners and emulsion polymerization toners; and colorants for formed plastic products such as films and bottles. The pigment dispersions can be used for a wide variety of applications.

As mentioned above, the resin-treated pigment according to the present invention is characterized especially in that the pigment has the A chain and is encapsulated with the chain B. As the A chain is soluble or miscible with a dispersion medium, a microdispersed product can be afforded. When employed in a plastic, for example, the A chain is fused, and hence, becomes miscible with the plastic, and moreover, the pigment is microdispersed. A formed product of high transparency can be afforded accordingly.

In the resin-treated pigment according to the present invention, the A chain is soluble in a dispersion medium, and the pigment is encapsulated with the B chain so that the resin does not separate from the pigment. Products that require microdispersion, which are represented by colorants for inkjet inks, color filters and polymerized toners, can thus be provided with high microdispersibility and high stability.

Owing to the encapsulation, the pigment can be provided with improved heat resistance and solvent resistance. There are pigments the crystals of which extend under heat or in organic solvents. The encapsulation of such pigments, however, prevents crystal growth of the pigments, which would otherwise occur as a result of melting of the pigments, so that the pigments remain in the microparticulate forms. A color filter pigment, for example, an ultrafinely-ground diketopyrrolopyrrole pigment is inferior in heat resistance. When a baking test is conducted at 200° C. or higher in a heat resistance test, the ultrafinely-ground diketopyrrolopyrrole pigment is reduced in the degree of microparticulation and is lowered in contrast due to the growth of its crystals and/or the formation of foreign matter. In contrast, the resin-treated pigment according to the present invention is good in heat resistance and can be further microparticulated owing to the encapsulation, and therefore, is very preferred.

Further, low-molecular azo pigments such as azo yellow pigments, for example, PY-74 (C. I. Pigment Yellow 74) are known to undergo crystal growth to have a greater particle size when they are exposed to heat or they exist in a solvent. However, their encapsulation makes it possible to prevent such crystal growth and to maintain the microparticulated form.

As applications of the resin-treated pigments of the present invention provided with such improved heat resistance, these resin-treated pigments are particularly useful as pigments for color filters, colorants for inkjet inks, colorants for polymerized toners, ground toners which are exposed to heat upon production, and the like.

EXAMPLES

The present invention will next be described more specifically based on Examples and Comparative Examples, although the present invention shall not be limited at all by these Examples. It is to be noted that all designations of "parts" and "%" in the subsequent description are on a mass basis.

Example 1

Production of Block Copolymer ASB-1

Into a reaction vessel fitted with a stirrer, reflux condenser, thermometer and nitrogen inlet tube, diethylene glycol dimethyl ether (hereinafter abbreviated as "diglyme") (53.1 parts), 2-iodo-2-cyanopropane (hereinafter abbreviated as "CP-1") (1.56 parts), 2,2'-azobisisobutyronitrile (hereinafter abbreviated as "AIBN") (1.3 parts), methyl methacrylate (hereinafter abbreviated as "MMA") (50 parts), and as a catalyst, 2,6-di-t-butyl-hydroxytoluene (hereinafter abbreviated as "BHT") (0.22 parts) were charged, followed by stirring at 80° C. while allowing nitrogen to flow. Polymerization was conducted for 4 hours to form an A chain. The polymerization conversion rate as calculated from a non-volatile content was 89%, the number average molecular weight was 5,900, and the molecular weight distribution was 1.30.

A mixture of methacryloxypropyltrimethoxysilane ("KBM-503", trade name, product of Shin-Etsu Chemical Co., Ltd.; hereinafter abbreviated as "KBM-503") (7.4 parts) and diglyme (7.4 parts) was then added, and polymerization was conducted at 80° C. for 3 hours to form a B chain.

After the polymerization, the resulting polymerization mixture was sampled and its solid content was measured. A polymer was found to be obtained substantially quantitatively. Upon measurement of its molecular weight by GPC, the value of Mn was 7,000, and the value of PDI was 1.35. As the molecular weight was greater than that of the block of A chain, the thus-obtained polymer is considered to have become an A-B block polymer. It is to be noted that the molecular weight of the B chain was calculated by subtracting the Mn value of the block of A chain from the Mn value of the whole A-B block polymer. As a result, the molecular weight of the B chain was found to be 1,100. The molecular weight of each B chain will hereinafter mean a value calculated as described above.

The polymerization mixture obtained as described above was then cooled. When its temperature had dropped to around room temperature, trimethyl orthoacetate (hereinafter abbreviated as "TMA") (2.8 parts) was added. Subsequent to stirring, the resultant polymer solution was taken out. The solid content in the polymer solution was 48.2%.

The polymer solution will be called "ASB-1". ASB-1 was an alkoxysilyl-containing block copolymer, in which the A chain miscible with a dispersion medium is polymethyl methacrylate (hereinafter abbreviated as "PMMA") and the alkoxysilyl-containing, reactive B chain was a copolymer of "KBM-503", a trimethoxysilyl-containing monomer, and MMA as a monomer still remaining after the formation of the A chain.

Production Process of Resin-Treated Titanium Oxide-1

A mill base of titanium oxide was next prepared according to the following formulation:

| | |
|---|---|
| Rutile-type titanium oxide | 50.0 parts |
| "ASB-1" | 10.3 parts |
| Toluene | 39.7 parts |

The rutile-type titanium oxide used in the above mill base had an average particle size of 0.25 µm, and had been treated with silica-alumina (10%). Based on the pigment, the amount of "ASB-1", an alkoxysilyl-containing block copolymer of the present invention, was 10%.

The above-described components were stirred for 1 hour by a disper mixer. The resulting mixture was filled in a plastic bottle, and by a paint shaker, was dispersed for 2 hours together with 1-mm zirconia beads as a microparticulation medium to obtain the mill base. The average particle size of the coated titanium oxide in the mill base was measured, and as a result, was found to be 0.31 µm.

The above-described mill base (90 parts) was next transferred to a reaction vessel fitted with a condenser, thermometer and water trap. Water (3 parts) were added, and with stirring, the resulting mixture was heated to 110° C., at which the mixture was refluxed for 3 hours to conduct dehydrating condensation. A solution caught in the water trap was cloudy. Upon analysis of the solution by gas chromatography, methanol was identified.

Three hours later, the resulting reaction mixture was cooled. A flask with methanol (300 parts) filled therein was provided. While stirring the methanol by a disper mixer, the reaction mixture was added. The titanium oxide was observed to precipitate and separate out. The precipitate was collected by filtration, washed with methanol, and then washed with water. The resulting filter paste was dried for 24 hours in a dryer controlled at 100° C. The yield was approximately 100%, and was substantially equal to the total weight of the used resin and titanium oxide. Grinding was then conducted by a grinding mill to obtain resin-treated titanium oxide-1.

Comparative Examples 1 & 2

Production of Random Copolymer ASR-1 and Homopolymer PMMA50

As comparative examples, two polymers were produced as will be described next. First, as Comparative Example 1, diglyme (53.1 parts) was charged and heated to 85° C. by using a similar apparatus as in Example 1. In a separate vessel, a mixed monomer solution was prepared using MMA (50 parts), "KBM-503" (7.4 parts) and AIBN (1.72 parts). Into the system containing the diglyme, a ⅓ portion by mass of the mixed monomer solution was added, and the remaining mixed monomer solution was then added dropwise over 1 hour from a dropping device. Polymerization was then conducted for 5 hours. The resulting polymerization mixture was sampled and its solid content was measured. A polymer was found to be obtained substantially quantitatively. Upon measurement of its molecular weight by GPC, Mn was 6,500, and PDI was 1.89. The polymerization mixture was cooled, and TMA (2.8 parts) was added. After stirring, the resultant polymer solution was taken out. The solid content in the polymer solution was 47.9%. The polymer solution will be called "ASR-1". ASR-1 was provided as a polymer of Comparative Example 1. The polymer of Comparative Example 1 was an alkoxysilyl-containing random copolymer in which alkoxysilyl groups were distributed at random on the molecular chain of the polymer.

As Comparative Example 2, a homopolymer of PMMA (Mn: 8,000, PDI: 2.13) was next provided. The homopolymer was dissolved in toluene to obtain a polymer solution having a solid content of 50%. This polymer solution will be called "PMMA-50". PMMA-50 was provided as a polymer of Comparative Example 2. The polymer of Comparative Example 2 was a polymer which did not contain alkoxysilyl groups as reactive groups.

Production Process of Comparative Resin-Treated Titanium Oxide-1 and Comparative Resin-Treated Titanium Oxide-2

Separately using ASR-1 and PMMA-50, mill bases of titanium oxide were prepared, followed by dispersion of the titanium oxide as in Example 1. After the dispersion, the average particle sizes of the titanium oxide in the respective mill bases were measured. The average particle size was 0.3 µm in the system that used ASR-1, while the average particle size was 0.45 µm in the system that used PMMA-50. The system that used ASR-1 was, therefore, able to disperse the titanium oxide as fine particles as in the system of Example 1 that used ASB-1. As reasons for this, the following consideration may be made. Described specifically, with ASR-1 of Comparative Example 1 which is an alkoxysilyl-containing polymer like ASB-1, dispersion is considered to have been promoted because its Si-containing groups have adsorptivity to the titanium oxide. Compared with PMMA-50 of Comparative Example 2 which contained no Si-containing groups, the dispersion is, therefore, considered to have proceeded further. Accordingly, ASB-1 and ASR-1 are both considered to have succeeded in dispersing the titanium oxide as fine particles.

The dispersions, which used ASR-1 and PMMA-50, respectively, were then separately heated and stirred as in Example 1. Of these, the dispersion which used ASR-1 was confirmed by a gas chromatographic analysis to leave methanol in a solution caught in a water trap. After the heating, the respective reaction mixtures were separately poured into large mounts of methanol to induce precipitation. The resulting precipitates were separately collected by filtration, washed, dried, and ground. The pigment treated with ASR-1 will be called "the comparative resin-treated titanium oxide-1", and the pigment treated with PMMA-50 will be called "the comparative resin-treated titanium oxide-2".

Storage Stability Test

The resins (ASB-1, ASR-1 and PMMA-50, 10 parts each) obtained as described above and portions (0.5 parts each) of water were placed in Erlenmeyer flasks, respectively, and were left over, as they were, without tight fitting of a plug therein. Results about the storage state of each resin-water mixture are presented in Table 1.

TABLE 1

Results of Storage Stability Test

| | After left over for 24 hours | $2^{nd}$ day | 1 week | One month |
|---|---|---|---|---|
| ASB-1 | Remained unchanged | Slightly thickened | Highly viscous | Highly viscous |
| ASR-1 | Slightly thickened | Thickened | Gelled | Gelled |
| PMMA-50 | Remained unchanged | Remained unchanged | Remained unchanged | Remained unchanged |

In the case of PMMA-50, no particular change was observed as it did not react. In the case of each of ASB-1 and ASR-1 as alkoxysilyl-containing polymers, the viscosity was confirmed to increase with time. This increase in viscosity can be considered to be attributable to the occurrence of a reaction that the alkoxysilyl groups in the polymer and water reacted to hydrolyze the alkoxysilyl groups and also to induce self-condensation.

Of these, ASR-1 was a random copolymer, contain alkoxysilyl groups at random sites of the entire molecular chain, and therefore, induced gelation upon hydrolysis and self-condensation. As the addition of the gelled matter, which was obtained in the above-described test, to methyl ethyl ketone (hereinafter abbreviated as "MEK") also resulted in white turbidity and precipitation, the gelled matter is considered to have been formed as a result of gelation through a reaction of the random copolymer in its entirety.

On the other hand, ASB-1 was a block copolymer so that alkoxysilyl groups existed locally on the molecular chain, and moreover, those alkoxylsilyl groups were small in molecular weight. Even when those alkoxylsilyl groups underwent hydrolysis and a self-condensation reaction, the self-condensation was considered to occur locally, and therefore, to induce no gelation although a viscosity increase would take place. When MEK was added to the high-viscosity matter obtained in the above-described test, the mixture obtained after left over for 1 week was clear with the high-viscosity matter being dissolved therein, and the mixture obtained after left over for 1 month turned to a bluish clear dispersion. The mixture obtained after left over for 1 week was soluble in tetrahydrofuran (hereinafter abbreviated as "THF"), and therefore, was measured by GPC. A sharp molecular weight peak at Mn=5,900 at the beginning of the test changed to a broad PDI after left over for 1 week, resulting in an increase in molecular weight with a molecular weight peak still remaining at a similar Mn as the sharp molecular weight peak (Mn: 12,000, PDI: 2.94). In FIG. 1, GPC charts of ASB-1 both before and after hydrolysis are shown. The solid line represents the GPC chart of ASB-1 at the beginning of the test, and the broken line represents the GPC chart of ASB-1 after left over for 1 week.

From the above-described results, in the case of ASB-1, alkoxysilyl groups are considered to exist on the block copolymer. When the block copolymer according to the present invention is provided as a product, the system is considered to undergo no gelation and to facilitate handling such as disposal even if the product absorbs water and the alkoxylsilyl groups undergo hydrolysis and a self-condensation reaction.

Thermal Analysis

The resin-treated titanium oxide-1 of the example and the comparative resin-treated titanium oxide-1 and comparative resin-treated titanium oxide-2 obtained in the comparative examples were separately subjected to a thermal analysis. In each thermal analysis, a weight reduction began around from 175 to 180° C. under a nitrogen gas stream, a weight reduction of about 10% took place until up to 400° C., and no further weight reduction was recognized at temperatures higher than 400° C. As reasons for this, it is considered that as a result of thermal decomposition and vaporization of the acrylic polymer, these resin-treated pigments were each formed of about 90% of titanium oxide and about 10% of the acrylic polymer and the titanium oxide was treated substantially quantitatively with the acrylic resin.

Solvent Solubility Test

A solvent solubility test was next performed. Each resin-treated titanium oxide (0.5 g) described above and THF (10 mL) were added to a 20-mL glass bottle, and were exposed to ultrasonic waves for 30 minutes to disperse the resin-treated titanium oxide. The resulting dispersion was processed by a centrifuge to precipitate the pigment. The supernatant was sampled, and measured for molecular weight. In the case of the resin-treated titanium oxide-1 of Example 1 which was treated with ASB-1, no polymer was detected. In the case of the comparative resin-treated titanium oxide-1 treated with ASR-1 of Comparative Example 1, however, a polymer was detected a little, and the detected polymer was 6,000 in Mn and 2.6 in PDI. In the case of the comparative resin-treated titanium oxide-2 treated with PMMA-50 of Comparative Example 2, a polymer of 5,300 in Mn and 3.2 in PDI was detected.

In the case of ASB-1 used in Example 1, it is considered from the foregoing that, because the alkoxylsilyl groups reacted with the surfaces of the silicon oxide pigment through their conversion to silanol groups and the dehydrating condensation of those silanol groups with the surfaces of the pigment or through self-condensation of the silanol, the block copolymer was three-dimensionally crosslinked into capsules and was not extracted with the solvent, and no polymer was hence detected, and also that the alkoxylsilyl-containing monomer had been surely introduced in the B chain by the living radical polymerization.

In the case of PMMA-50 used for the comparative resin-treated titanium oxide-2, on the other hand, it is considered that, because the resin did not react with the pigment but was simply in adhesion with the pigment, the resin was separated from the pigment by the solvent and was allowed to dissolve in the solvent.

Further, in the case of the comparative resin-treated titanium oxide-1, a polymer was detected a little in the above-described test. As reasons for this, the following inference may be made. Described specifically, it is considered that, because the distribution of monomer units cannot be controlled in such random copolymerization as employed for ASR-1, PMMA polymer molecules with no alkoxylsilyl-containing monomer units introduced therein were formed to some extent, did not react with the surfaces of the pigment, were dissolved with the solvent, and then, were detected by GPC. In the case of ARB-1 used for the resin-treated titanium oxide-1 and containing the block copolymer of the example, on the other hand, the distribution of monomer units was controlled, the concentration of alkoxysilyl-containing monomer units was high, alkoxysilyl groups had been surely introduced in the polymer chain, and therefore, the block copolymer was not dissolved in the solvent.

Figure 2:
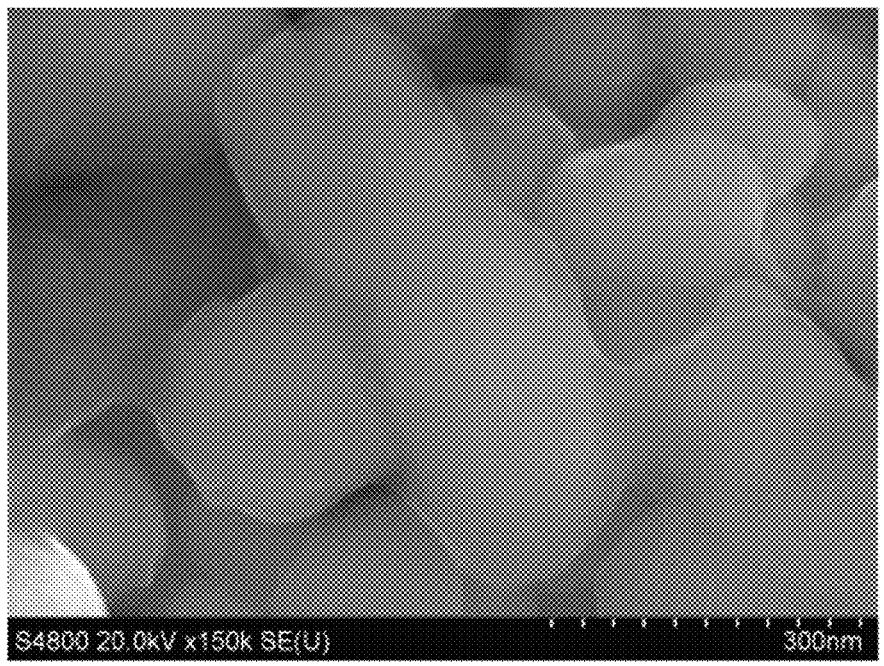
FIG. 2 is an electron micrograph of titanium oxide-1 treated with a resin, specifically ASB-1.
Figure 3:
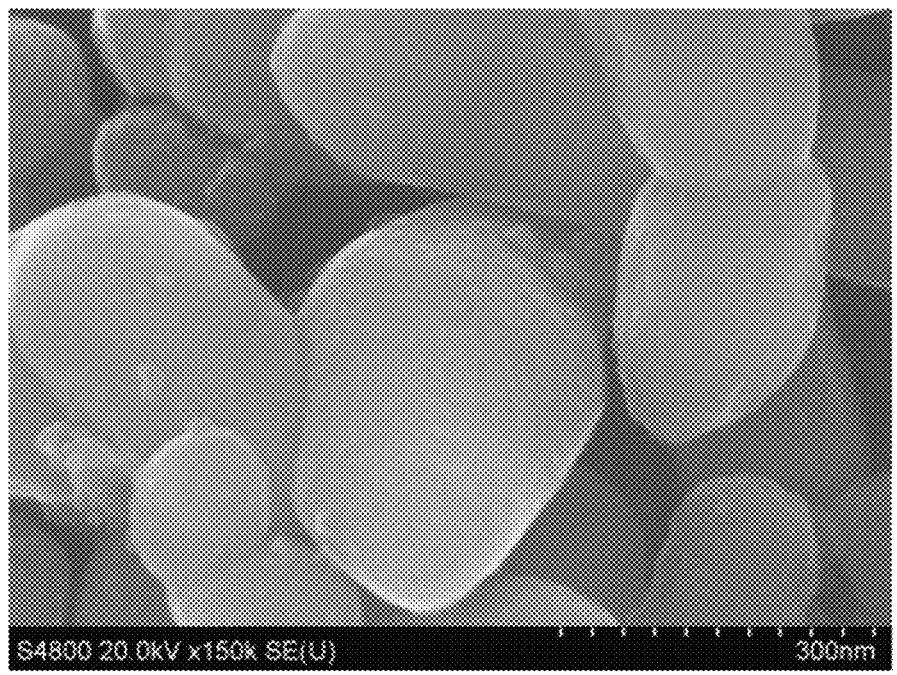
FIG. 3 is an electron micrograph of a resin-untreated titanium oxide pigment.

Electron micrographs of the pigment treated with ASB-1 (the resin-treated titanium oxide-1) and the untreated pigment (titanium oxide) are shown as figures. FIG. 2 shows the electron micrograph of the resin-treated titanium oxide-1, and FIG. 3 shows the electron micrograph of the untreated pigment. The electron micrograph of FIG. 2 was taken after the dissolution treatment with the solvent in the above-described solvent solubility test. It was possible to confirm that the pigment particles were encapsulated with ASB-1.

Dispersion Test

In plastic bottles, mill bases were prepared according to the following formulation:

| | |
|---|---|
| MEK | 20 parts |
| Toluene | 20 parts |
| Each resin-treated titanium oxide | 60 parts |

The mill bases were separately added to plastic bottles in which 1-mm zirconia beads had been placed, and dispersed for 3 hours on paint shakers. When average particle sizes were measured, the resin-treated titanium oxide-1 was as large as 0.31 µm. The comparative resin-treated titanium oxide-1 was as large as 0.53 µm, and coarse particles which had not been fully dispersed were observed. The comparative resin-treated titanium oxide-2 was as large as 0.39 µm. From the foregoing, it is considered that, in the comparative resin-treated titanium oxide-1 produced using ASR-1 in which alkoxysilyl groups were distributed at random, the concentration of alkoxysilyl-containing monomer units was not sufficient and the resin did not react fully at parts thereof with the pigment particles. It is further considered that bonding hence occurred between pigment particles, the thus-bonded, plural pigment particles were encapsulated with ASR-1, and therefore, the average molecular weight was not reduced.

It is considered that in the resin-treated titanium oxide-1 treated using ASB-1 of the example of the present invention, alkoxysilyl groups concentrated on the B chain and had a small molecular weight, no much reaction (bonding) took place between pigment particles themselves, the individual particles were encapsulated in the well-dispersed state, and the dispersion of the encapsulated particles achieved microparticulation.

Colors, which had been prepared by dispersing the respective resin-treated titanium oxide pigments obtained as described above, were next separately placed in sample bottles, and were left over at room temperature for 1 week. The pigment treated with the block copolymer of the present invention (the resin-treated titanium oxide-1) settled, but the settling occurred to such an extent that only a thin supernatant layer was formed. In the case of each of the comparative resin-treated titanium oxide-1 and the comparative resin-treated titanium oxide-2, a thin supernatant layer was formed to greater extent and more settling occurred, both compared with the case of the resin-treated titanium oxide-1 obtained using ASB-1.

Those left-over colors were shaken several times. In the case of the resin-treated titanium oxide-1 of Example 1, the settlings were reduced, and substantially no settlings were collected although an attempt was made to scoop the settlings on the bottom with a spatula. Further, its average particle size was measured. The average particle size was found to be 0.36 nm. Therefore, the dispersion had been evidently restored although the average particle size did not reach the particle size at the beginning.

On the other hand, in the case of the comparative resin-treated titanium oxide-1 of Comparative Example 1, the settlings were reduced when shaken several times, but a lot of settlings was collected when the settlings on the bottom were scooped with a spatula. The dispersion had been restored, and the particle size was 1 µm. In the case of the comparative resin-treated titanium oxide-2 of Comparative Example 2, the settlings hardly disappeared, and were found to be relatively hard when scraped off by a spatula. The average particle size was 2 µm or greater, and therefore, the dispersion had not been restored. From the foregoing, it is considered that in the case of the resin-treated titanium oxide-1 of Example 1, the B chain in the structure of the used ASB-1 reacts with the pigment while the A chain exhibits solubility in the dispersion medium, and, even if the pigment settles, it can hence be prevented from aggregation and the dispersion can thus be easily restored owing to the dissolution and dispersion of the A chain.

Using the above-obtained colors with the resin-treated titanium oxide pigments dispersed therein, respectively, alkyd resin paints with methoxymethylol melamine contained as a cross linking agent were prepared. Those alkyd resin paints were coated on aluminum plates, and were then dried. In the case of the resin-treated titanium oxide-1 of Example 1, the color development was high in density, was beautiful, and was also good in gloss. In the case of the comparative resin-treated titanium oxide-1 of Comparative Example 1, the gloss resulted in a lower value than in the case of the resin-treated titanium oxide-1. As reasons for this, it is considered that the comparative resin-treated titanium oxide-1 was greater in average particle size compared with the resin-treated titanium oxide-1. Also in the case of the comparative resin-treated titanium oxide-2 of Comparative Example 2, the gloss was low and the color development was not good. As a result, the resin-treated titanium oxide of the example of the present invention was confirmed to afford a good dispersion and to be excellent as a colorant.

Example 2 & Comparative Example 3

A similar procedure as in Example 1 was performed by using ASB-1 and changing the pigment from the titanium oxide to fine particulate zinc oxide (average particle size: 20 nm, treated with silica-alumina (20%)), whereby a resin-treated pigment was prepared. Upon dispersion before dehydrating condensation, the average particle size of the zinc oxide was 41 nm. The dispersion was then heated to induce dehydrating condensation. The resulting resin-treated pigment was precipitated in methanol, collected by filtration, washed and dried. The resin-treated pigment was obtained substantially quantitatively. The dried resin-treated pigment was ground to obtain resin-treatedzinc oxide. In a similar manner as in Example 1, a solvent solubility test was performed on the resin-treated zinc oxide. No polymer was detected by GPC. The zinc oxide is considered to have been encapsulated with ASB-1 in a good form as in the case of Example 1.

By a similar procedure as in Example 1, the resin-treated zinc oxide obtained as described above was processed according to the below-described formulation to obtain a color with the resin-treated zinc oxide dispersed therein.

| | |
|---|---|
| Resin-treated zinc oxide | 12 parts |
| Acrylic resin | 8 parts |
| Butyl acetate | 21 parts |

Employed as the acrylic resin was a 50% solution of a styrene/2-hydroxyethyl methacrylate/methyl methacrylate/butyl methacrylate copolymer in butyl acetate. The average particle size of the color after the dispersion processing was 50 nm.

As Comparative Example 3, a similar silica alumina-treated zinc oxide as that used for the resin treatment in Example 2 was used as it was, and a color was prepared as in Example 2. The average particle size was 0.1 µm.

Those two colors were left over for 1 week. Both of them underwent settling, and formed thin layers of supernatant. The clear supernatant was formed to greater extent in the color of Comparative Example 3 than in the color of Example 2 in which the resin-treated zinc oxide was used. When settlings were stirred by a spatula, the color of Example 2 in which the resin-treated zinc oxide was used was readily dispersed, and the settlings disappeared. In the color of Comparative Example 3, on the other hand, the settlings were tacky, and the color did not return to the original dispersion state in a short time.

As a result, it has been found that microparticulation was achieved in the resin-treated zinc oxide of Example 2 and its use can provide an excellent color free from aggregation of settlings.

Paints were each prepared by using the color of the resin-treated zinc oxide obtained as described in Example 2 or the color of Comparative Example 3, employing the acrylic resin as a binder, and adding butyl acetate such that the zinc oxide amounted to 10% of the solid content.

Those paints were then spread over PET films by a bar coater (No. 5). After left over at room temperature for 10 minutes, the paints were baked at 130° C. for 10 minutes.

As a result, the coating film obtained by using the resin-treated pigment of the example had a transparent appearance. When the coating film was measured for transmittance, its transmittance was 89% at 500 nm. On the other hand, the transmittance of the coating film obtained by using the color of Comparative Example 3 was 72%. As a result, it is considered that the resin-treated pigment of the example was microdispersed, and hence, provided the coating film with higher transparency.

Further, the coating film obtained by using the resin-treated pigment of the example was measured by a spectrophotometer, and was found to cause an absorption in the UV range. From these findings, the paint obtained by using the resin-treated pigment of the example of the present invention was found to be a UV-absorbing paint of high transparency.

Next, the paints of the example and comparative example obtained as described above were coated on aluminum plates, dried similarly, and exposed to UV light for 100 hours by "SUPER UV TESTER". As a result, in the case of the paint of the comparative example, fine powder was formed on the surface so that chalking was observed. In the case of the paint making use of the resin-treated pigment of the example of the present invention, on the other hand, no chalking was observed, and the paint was found to have high transparency and excellent light resistance.

Twenty (20) percent of the resin-treated zinc oxide of Example 2 was added to a polymethyl methacrylate resin. By a twin-screw extrusion machine, the resulting mass was kneaded and extruded at a cylinder temperature of 200° C. to prepare a master batch. The resulting master batch (10 parts) was added to and mixed with polymethyl methacrylate (90 parts). Using the extrusion machine, the thus-obtained mass was mixed and molten at 50 rpm screw speed and 200° C., and was then extruded to obtain an extruded plate of 2 mm in thickness.

The extruded plate was visually transparent. When the extruded plate was measured for transmittance, its transmittance was 80% at 500 nm. As a comparative example, an extruded plate was formed with zinc oxide, which had not been resin-treated, in a similar manner as described above, and its transmittance was measured. The extruded plate was foggy with 56% transmittance at 500 nm.

As reasons for the above-described results, it is considered that the A chain in the structure of ASB-1 of the present invention used in Example 2 was fused, the block copolymer became miscible with the poly(methyl methacrylate) resin as a plastic, and the resin-treated pigment was hence microdispersed to provide the extruded plate with the higher transparency.

Example 3

Into a similar apparatus as in Example 1, diglyme (147 parts), iodine (1.5 parts), 2,2'-azobis(2-methoxy-2,4-dimethylvaleronitrile) ("V-70", trade name, product of Wako Pure Chemical Industries, Ltd.; hereinafter abbreviated as "V-70") (5.5 parts), MMA (67.5 parts), methacrylic acid (hereinafter abbreviated as "MAA") (13 parts) and succinimide (hereinafter abbreviated as "SI") (0.1 parts) were charged, followed by heating to 40° C. while allowing nitrogen to flow. In 3 hours, the brown color of the iodine disappeared, and instead, a lemon color appeared so that an iodine compound was formed as an initiator compound. Polymerization was then conducted for 4 hours to form an A chain. The polymerization conversion rate as calculated from a nonvolatile content was 94%, Mn was 5,900, and PDI was 1.32. In a detection of UV absorption by GPC, no peaks were measured although only very small ones were observed.

Methacryloxypropyltriethoxysilane ("KBE-503", trade name, product of Shin-Etsu Chemical Co., Ltd.; hereinafter abbreviated as "KBE-503") (21.6 parts) and benzylmethacrylate (hereinafter abbreviated as "BzMA") (31.6 parts) were then added, and polymerization was conducted for 6 hours to form a B chain. The resulting polymerization mixture was sampled and its solid content was measured. A polymer was found to be obtained substantially quantitatively. Mn and PDI as measured by GPC were 8,100 and 1.40, respectively.

Figure 4:
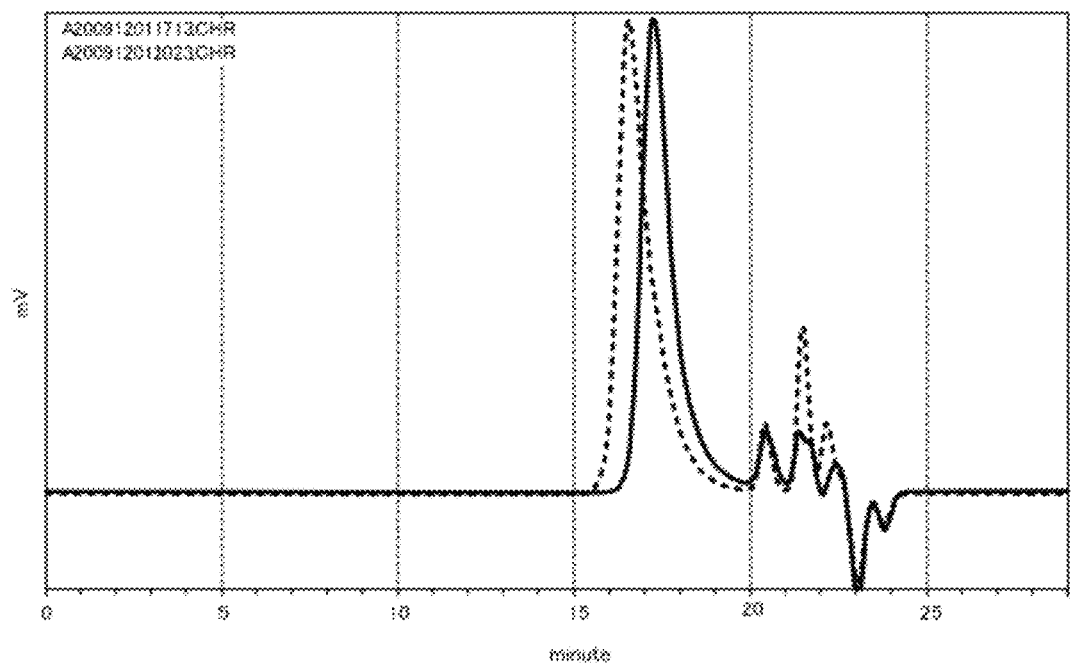
FIG. 4 shows GPC charts of an A chain and an A-B block copolymer.

As the molecular weight was greater than that of the A chain as in Example 1, the thus-obtained polymer is considered to be an A-B block copolymer. Charts of the molecular weights of the A chain and A-B block copolymer are shown in FIG. 4. The molecular weight of the B chain was 2,200. In the charts, the solid line represents the molecular weight distribution of the A chain, and the broken line represents the molecular weight distribution of the A-B block copolymer.

As BzMA was copolymerized in the block copolymer, the block copolymer caused a UV absorption. Mn as determined based on that UV absorption by GPC was 8,050, which was substantially equal to a molecular weight measured in the visible range. The A chain caused no absorption in the UV range, but the introduction of BzMA led to the absorption in the UV range, and hence, to the determination of the similar molecular weight as that obtained based on the absorption in the visible range. This suggests that the polymer obtained as described above was an A-B block copolymer.

The polymerization mixture obtained as described above was then cooled. When its temperature had dropped to around room temperature, TMA (3.4 parts) was added. Subsequent to stirring, the resultant polymer solution was taken out. The solid content in the polymer solution was 48.3%. The polymer solution will be called "ASB-2". ASB-2 was an alkoxysilyl-containing block copolymer, in which the A chain miscible with a dispersion medium is a carboxyl-containing polymer and the alkoxysilyl-containing, reactive B chain was a copolymer of "KBE-503" as a trimethoxysilyl-containing monomer, BzMA, and a remaining portion of the monomer for the A chain.

Production Process of Resin-Treated Titanium Oxide-2

Similar titanium oxide (100 parts) as that used in Example 1, water (400 parts) and methanol (100 parts) were next charged in a 2,000-mL flask, and the resulting mixture was stirred at 4,000 rpm by a homogenizer.

To a separate vessel, ASB-2 (20.7 parts), methanol (10 parts), water (10 parts) and 25% aqueous ammonia (2 parts) were added, followed by stirring to prepare an aqueous solution of ASB-2. ASB-2 was completely dissolved so that the aqueous solution was clear.

The aqueous solution of ASB-2 was then added to the titanium oxide suspension. The resulting mixture was stirred at 4,000 rpm for 1 hour, and was then heated to 70° C., at which a reaction was conducted for 3 hours. The pH at that time was 9.6. Three hours later, the reaction mixture was cooled, transferred to a disper mixer, and then stirred at 1,000 rpm. Water (1,000 parts) was added. Subsequently, a 10% aqueous solution of acetic acid was added dropwise. The resulting mixture thickened at around pH 6, and the viscosity dropped when the aqueous solution of acetic acid was added further. The aqueous solution of acetic acid was further added dropwise until the pH dropped to 4. As a result, the titanium oxide separated out. The titanium oxide was collected by filtration, thoroughly washed with water, dried for 24 hours in a drier controlled at 110° C., and then ground. This will be called "the resin-treated titanium oxide-2".

Water-Based Color

The resin-treated titanium oxide-2 (250 parts) obtained as described above, monoethanolamine (8 parts) and water (742 parts) were charged and stirred to prepare a mill base. The mill base was circulated 5 times through a horizontal bead mill in which 1-mm zirconia beads had been placed, so that the mill base was sufficiently dispersed. The resulting dispersion was then passed through a 5-μm filter to remove coarse particles and to obtain a color of the resin-treated titanium oxide-2. The color was 0.25 μm in average particle size, and had been microdispersed.

When the color was left over for 1 week, a transparent supernatant was observed a little, and settlings were also observed. However, those settlings disappeared when merely stirred by a spatula. When the average particle size was measured, it was found to be 0.3 μm. The dispersion had, therefore, been restored substantially. The viscosity was 11 cps (mPa·s).

Water-Based Inkjet Color

Using the color, an ink was prepared according to the following formulation:

| | |
|---|---|
| Color of the resin-treated titanium oxide-2 | 48 parts |
| Glycerin | 1 parts |
| Propylene glycol | 8 parts |
| Styrene acrylic emulsion | 31.5 parts |
| Water | 11.5 parts |

As the styrene acrylic emulsion, a styrene/butyl acrylate/methacrylic acid (mass ratio: 35/65/2) copolymer was used at a solid content of 20%. The above components were thoroughly mixed and stirred, and then passed through a 5-μm filter to remove foreign matter and the like and to obtain an ink. The viscosity was 4.1 mPa·s.

When the ink was stored at 70° C. for 2 days, its average particle size was 0.31 μm, and its viscosity was 4.0 mPa·s. The ink was, therefore, also excellent in storage stability.

The ink obtained as described above was filled in an ink cartridge. By an inkjet printer, solid printing was performed on a surface-treated, 50-μm PET film. The resulting print had a high optical density and gloss value, was free of misalignment, and was also good in scratch resistance. Especially in a "CELLOTAPE®" peel test, the ink was not peeled off at all and showed good adhesion.

Example 4

Using a similar apparatus as in Example 1, diglyme (332 parts), iodine (2.024 parts), "V-70" (9.856 parts), MMA (140 parts), MAA (34.4 parts) and BHT (0.44 parts) were charged, followed by heating to 40° C. while allowing nitrogen to flow. In 3 hours, the brown color of the iodine disappeared, and instead, a lemon color appeared so that an iodine compound was formed as an initiator compound. Polymerization was then conducted for 4 hours to form an A chain. The polymerization conversion rate as calculated from a nonvolatile content was 97%, Mn was 8,900, and PDI was 1.42.

Cyclohexylmethacrylate (hereinafter abbreviated as "CHMA") (96 parts) and "KBM-503" (37.2 parts) were then added, and polymerization was conducted for 7 hours to form a B chain. The resulting polymerization mixture was sampled and its solid content was measured. A polymer was found to be obtained substantially quantitatively. Mn and PDI as measured by GPC were 11,800 and 1.53, respectively.

As the molecular weight was greater than that of the A chain as in Example 1, the thus-obtained polymer is considered to be an A-B block copolymer. The molecular weight of the B chain was 2,900.

The polymerization mixture was next cooled. When its temperature had dropped to around room temperature, TMA (7.7 parts) was added. Subsequent to stirring, the resulting polymer solution was taken out. The solid content in the polymer solution was 47.2%. The polymer solution will be called "ASB-3".

ASB-3 was an alkoxysilyl-containing block copolymer, in which the A chain miscible with a dispersion medium is a carboxyl-containing polymer and the alkoxysilyl-containing, reactive B chain was a copolymer of "KBM-503" as a trimethoxysilyl-containing monomer, CHMA of high hydrophilicity, and a remaining portion of the monomer for the A chain.

Production Process of Resin-Treated Organic Pigment

The polymer solution (ASB-3) (100 parts) obtained as described above, butyl carbitol (50 parts), sodium hydroxide (2.7 parts) and water (47.3 parts) were mixed and stirred to prepare an aqueous solution of ASB-3. Its solid content was 24.8%.

Using the aqueous solution of ASB-3, a mill base was prepared according to the formulation to be described next. Dimethylquinacridone pigment (PR-122, average particle size: 85 nm, a water-based paste having 30% solid content) (300 parts) as a magenta pigment, the aqueous solution of SB-3 (60.5 parts), butyl carbitol (25 parts) and water (14.5 parts) were combined and thoroughly stirred. The resulting mill base was thoroughly dispersed in a horizontal bead mill in which 0.5-mm zirconia beads had been placed. The color obtained as described above was passed through a 5-μm filter to remove coarse particles and to obtain a magenta color. Its average particle size was 110 nm.

Methoxytrimethylsilane (5 parts) was next added to the color, followed by thorough stirring.

A 5-L vat was next fitted with a disper mixer. The magenta color (300 parts) obtained as described above and water (1,200 parts) were mixed and stirred, and then heated to from 85° C. to 90° C., followed by stirring for 3 hours.

The resulting mixture was then cooled, and a 10% aqueous solution of acetic acid was added dropwise to lower the pH to 3.5. The pigment precipitated out from water. The pigment was collected by filtration, washed, dried at 100° C. for 24 hours, and then ground to obtain resin-treated magenta.

Separately using an azo pigment (PY-74, average particle size: 90 nm) as a yellow pigment, a copper phthalocyanine pigment (PB-15:3, average particle size: 75 nm) as a cyan pigment, and carbon black ("MB-1000", trade name, product of Mitsubishi Chemical Corporation), resin-treated pigments were prepared as in the case of the magenta. These resin-treated pigments will be called "the resin-treated yellow", "the resin-treated cyan" and "the resin-treated black", respectively.

On the resin-treated organic pigments obtained as described above, a similar solvent solubility test as that performed in Example 1 was performed. Dissolved polymers were not detected much although very small peaks were observed in GPC analyses. It is, therefore, considered that encapsulation had been achieved.

Inkjet Inks

Using the resin-treated magenta obtained as described above, a mill base was prepared to have the following formulations:

| | |
|---|---|
| Resin-treated magenta | 16.5 parts |
| Aqueous ammonia | 0.6 parts |
| Butyl carbitol | 10 parts |
| Water | 72.9 parts |

The mill base was dispersed for 30 minutes by a disper mixer, and was then thoroughly dispersed by using a horizontal medium disperser. The resulting dispersion was then passed through a 5-μm filter to remove coarse particles. At that time, the particle size of the pigment in the dispersion was 106 nm, and the viscosity of the dispersion was 3.0 mPa·s.

As a comparative example, a color was prepared according to the following formulation:

| | |
|---|---|
| Resin-treated magenta pigment | 15 parts |
| Acrylic styrene resin | 5 parts |
| Butyl carbitol | 10 parts |
| Water | 70 parts |

Employed as the acrylic styrene resin was an ammonia-neutralized aqueous solution (solid content: 30%) of a styrene/acrylic acid/α-methylstyrene copolymer (acid value: 210 mgKOH/g, Mn: 6,000, PDI: 1.83).

In a similar manner as mentioned above, a color was also prepared with a resin-untreated magenta pigment being contained therein. Its average particle size was 106 nm, and its viscosity was 3.2 mPa·s.

Separately using the color of the resin-treated magenta and the color dispersion of the comparative example, water-based inkjet inks were prepared according to the following formulation:

| | |
|---|---|
| Aqueous pigment dispersion | 100 parts |
| Water | 275 parts |
| 1,2-Hexanediol | 40 parts |
| Glycerin | 80 parts |
| "SURFYNOL 465" (product of Air Products and Chemicals, Inc.) | 5 parts |

Those inks were each centrifuged at 8,000 rpm for 20 minutes to remove coarse particles, followed by filtration through a 5-μm membrane filter. Magenta color inks of the example and comparative example were obtained accordingly.

Those inks were stored at 70° C., and changes in average particle size and viscosity, which occurred with the time of storage, were observed. The results are presented in Table 2.

TABLE 2

Evaluation Results of Storage Stability

| | | Time | | | |
|---|---|---|---|---|---|
| | | 0 hour | 15 hours | 4 days | 7 days |
| Resin-treated magenta (example) | Average particle size (nm) | 106 | 105 | 102 | 108 |
| | Viscosity (mPa·s) | 3.0 | 2.8 | 2.8 | 2.8 |
| Magenta pigment (comp. ex.) | Average particle size (nm) | 106 | 117 | 150 | 201 |
| | Viscosity (mPa·s) | 3.2 | 3.4 | 3.6 | 4.4 |

It is considered that, because the resin-treated magenta of Example 4 of the present invention was encapsulated, the resin did not separate from the pigment, and the A chain was dissolved in the aqueous medium, steric hindrance acted and stable microparticulation was achieved. In the case of the comparative example, on the other hand, it is considered that the dispersant separated to result in poor storage stability.

With the remaining three colors, that is, the resin-treated yellow, the resin-treated cyan and the resin-treated black, inks were prepared and tested for storage stability as in the case of the magenta. Those inks gave good results like the ink that used the resin-treated magenta.

Concerning the yellow pigment in particular, it is a low-molecular azo pigment, and therefore, undergoes a crystalline growth under heat. In the present invention, however, the yellow pigment showed good stability. Without the resin treatment, the yellow pigment was also dispersed similarly to prepare a color. In a similar manner as in the case of the magenta, the color was formulated into a comparative inkjet ink, and the comparative inkjet ink was tested for storage stability. The results of the storage test on the resin-treated and resin-untreated yellow pigments are presented in Table 3.

TABLE 3

Evaluation Results of Storage Stability

| | | Time | | | |
|---|---|---|---|---|---|
| | | 0 hour | 15 hours | 4 days | 7 days |
| Resin-treated yellow (example) | Average particle size (nm) | 102 | 105 | 107 | 106 |
| | Viscosity (mPa·s) | 3.4 | 3.4 | 3.4 | 3.3 |
| Yellow pigment (comp. ex.) | Average particle size (nm) | 117 | 129 | 142 | 145 |
| | Viscosity (mPa·s) | 3.8 | 3.6 | 3.5 | 3.6 |

The four color inks of the examples of the present invention as described above were separately filled in ink cartridges, and by an inkjet printer, solid printing was performed on inkjet glossy paper "PHOTOLIKE QP" (product of Konica Minolta Business Technologies, Inc.). As a result, prints of good quality were obtained with high gloss and density from all the inks, respectively.

Example 5

A diketopyrrolopyrrole pigment (PR-254) (100 parts) as a red pigment, diethylene glycol (hereinafter "DEG") (200 parts), ASB-3 (40 parts) obtained in Example 4 and common salt (800 parts) were charged in a 3-L kneader. While controlling kneader to maintain its temperature at from 100 to 120° C., grinding was conducted for 4 hours to obtain a kneaded mass. When observed under a microscope, the average particle size was 41 nm.

The kneaded mass was added to water (2,000 parts). The resulting mixture was heated to 80° C., and was stirred at high speed. Filtration, washing and grinding were then conducted to obtain a pigment paste (solid content: 30%). The pigment paste (240 parts) was added to water (1,000 parts), the pigment was allowed to deflocculate again, and then, filtration and washing were conducted. Subsequently, the pigment was dried for 24 hours in a vacuum drier controlled at 50° C. As a result, the pigment turned to a fragile, fine, clumpy powder. The powder was next ground by an attritor grinding mill to obtain a powder pigment. The powder pigment was provided as resin-treated red.

On the resin-treated red, a similar solvent solubility test as that performed in Example 1 was performed. No dissolved polymer was confirmed. It is, therefore, considered that encapsulation had been achieved.

To the below-described acrylic resin varnish (50 parts), the above-obtained resin-treated red (15 parts), the below-described polyester-polyamide dispersant (10 parts) and PGMAc (25 parts) were next added. Subsequent to premixing, the resultant mixture was dispersed in a horizontal bead mill to obtain a red pigment dispersion. The acrylic resin varnish used as described above was a solution of a copolymer, which had been obtained by copolymerizing benzyl methacrylate, methacrylic acid and 2-hydroxyethyl methacrylate at a molar ratio of 70/15/15 and had a molecular weight of 12,000 and an acid value of 100, in PGMAc (solid content: 40%). As the polyester-polyamide dispersant used as described above, a reaction product of polycaprolactone and polyethylenimine in the presence of 12-hydroxystearic acid as an initiator was used with a solid content of 46%. The average particle size of the pigment in the red pigment dispersion obtained as described above was measured. The average particle size was found to be approximately 53 nm. The red pigment dispersion was, therefore, a microdispersed pigment dispersion having a microparticulated particle size. Its viscosity was 11.6 mPa·s.

For the sake of a comparison, the resin-untreated red pigment employed as described above was formulated as described above, whereby a comparative red pigment dispersion was obtained. The average particle size of the pigment in the resultant comparative red pigment dispersion was measured. The average particle size was found to be approximately 63 nm, and therefore, was greater than that of the example. The viscosity was 12.3 nm, and therefore, was higher than that of the example.

Using, as a color for an image display, the pigment dispersion obtained with the resin-treated red of Example 5 as mentioned above, an R(red) color filter plate was fabricated. The color filter plate was confirmed to have excellent spectral curve characteristics, to be excellent in durability such as light resistance and heat resistance, to have superb properties in contrast and light transmission, and to show outstanding characteristics for the display of images.

The color filter plate obtained as described above was heated at 270° C. for 10 minutes. In the case of the dispersion making use of the resin-treated red of the example, the percent retention of contrast before and after the heating was 90% so that excellent heat resistance was demonstrated. As has been described above, the availability of a heat-withstandable particulate form was confirmed in the example of the present invention.

Using the comparative red pigment dispersion obtained as described above, a color filter plate was fabricated as in the case of the above-described example. Similar to the resin-treated red of the example, the color filter plate had excellent spectral curve characteristics, was excellent in durability such as light resistance, had superb properties in contrast and light transmission, and showed outstanding characteristics for the display of images. When heating was conducted at 270° C. for 10 minutes, however, the percent retention of contrast before and after the heating all dropped to 40% or less. In addition, granules were observed as foreign matter.

It is considered that, when the pigment was encapsulated with the resin as specified in the present invention, the pigment was free from fusion, aggregation or crystallization under heat, the dispersed microparticulate state of the pigment was not disturbed by heat, and as a consequence, the heat resistance was improved to result in an increase in the percent retention of contrast in the case of the example. In the case of the resin-untreated pigment of the comparative example, on the other hand, it is considered that the pigment aggregated or fused under heat to have a greater particle size and the contrast was lowered.

Example 6

Using a similar apparatus as in Example 1, diglyme (163 parts), iodine (1.52 parts), "V-70" (7.392 parts), MMA (45 parts), 2-ethoxyethyl methacrylate (47.4 parts) and diphenylmethane (0.3 parts) were charged, followed by heating to 40° C. while allowing nitrogen to flow. In 3 hours, the brown color of the iodine disappeared, and instead, a lemon color appeared so that an iodine compound was formed as an initiator compound. Polymerization was then conducted for 4 hours to form an A chain. The polymerization conversion rate as calculated from a nonvolatile content was 97%, Mn was 5,900, and PDI was 1.40.

A mixture of BzMA (31.6 parts) and "KBE-503" (30.4 parts) were then added, and polymerization was conducted for 7 hours to form a B chain. The resulting polymerization mixture was sampled and its solid content was measured. A polymer was found to be obtained substantially quantitatively. Mn and PDI as measured by GPC were 9,400 and 1.37, respectively.

As the molecular weight was greater than that of the A chain as in Example 1, the thus-obtained polymer is considered to be an A-B block copolymer. The molecular weight of the B chain was 3,500.

The polymerization mixture obtained as described above was then cooled. When its temperature had dropped to around room temperature, TMA (1.3 parts) was added. Subsequent to stirring, the resultant polymer solution was taken out. The solid content in the polymer solution was 48.2%. The polymer solution will be called "ASB-4". ASB-4 so obtained was an alkoxysilyl-containing block copolymer, in which the A chain miscible with a dispersion medium is a soft polymer and the alkoxysilyl-containing, reactive B chain was a copolymer of "KBM-503" as a trimethoxysilyl-containing monomer, BzMA having an aromatic ring, and a remaining portion of the monomer for the A chain.

Production Process of Resin-Treated Titanium Oxide-3

Rutile-type titanium oxide (average particle size: 0.21 μm, treated with alumina (5%)) (100 parts), methanol (500 parts) and water (5 parts) were added to a capped 2,000-L flask, and the resulting mixture was stirred at 4,000 rpm by a homogenizer. ABS-4 (41.5 parts) was then added. The resulting solution was stirred for 1 hour, and was then heated for 5 hours to reflux the methanol.

After cooling, the solution was poured into water (5 L) which had been cooled to 5° C. by the addition of ice, and precipitation was allowed to occur.

Subsequently, the precipitate was collected by filtration as it was, and was thoroughly washed with water to obtain a viscous paste. The paste was dried for 24 hours at 110° C., and then ground. This will be called "the resin-treated titanium oxide-3".

On the resin-treated titanium oxide-3 so obtained, a solvent solubility test was performed as in Example 1. No free resin was confirmed. It is, therefore, considered that the pigment had been encapsulated.

Preparation of UV-Curable Ink

When ASB-4 was added to trimethylolpropane triacrylate and also to phenoxyethyl acrylate, both acrylic oligomers, ASB-4 dissolved to give clear solutions. ASB-4 was, therefore, confirmed to have good solubility. As reasons for this, it is considered that in ASB-4, the ethoxymethyl groups on the A chain were miscible with the above-described acrylate monomers.

After the resin-treated titanium oxide-3 (225 parts) obtained as described above, trimethylolpropane triacrylate (97.5 parts) and phenoxyethyl acrylate (112.5 parts) were next mixed, the resulting mixture was dispersed in a horizontal bead disperser. The thus-obtained dispersion was passed through a 5-μm filter to remove coarse particles, whereby a color was obtained. The average particle size of the color was 0.27 μm.

When left over for 1 week, settlings were observed. Upon stirring by a spatula, those settlings disappeared, and the dispersion was restored.

The color (29 parts), urethane acrylate (7.5 parts), ethylene oxide-added trimethylolpropane triacrylate (40 parts) and 1,6-hexane diacrylate (23.5 parts) were then mixed to prepare a UV-curable inkjet ink.

The ink obtained as described above was filled in an ink cartridge. By an inkjet printer, solid printing was performed on a surface-treated, 50-μm PET film. The ink was then cured by a conveyor-type UV irradiation system to obtain a print. In the printing test, the ink caused no clogging and was excellent in ejection properties, and the printed image was superb in whiteness density and cure quality.

INDUSTRIAL APPLICABILITY

As application examples of the present invention, pigment dispersions having excellent physical properties can be obtained from pigments treated with an alkoxysilyl-containing block copolymer of the present invention. The use of these pigment dispersions can provide various products, such as paints, inks, coating formulations, and moldings and otherwise formed products, with excellent physical properties, and therefore, can furnish a variety of high-performance products.

The invention claimed is:

1. An alkoxysilyl-containing A-B block copolymer formed from (meth)acrylate monomers as constituent monomers, the A-B block copolymer consisting of, as blocks of the copolymer:
    a polymer block of A chain that consists of monomers selected from the group consisting of aliphatic (meth)acrylate, alicyclic (meth)acrylate, aromatic alkyl (meth)acrylate, and mixtures thereof and has a number average molecular weight (Mn) from 1,000 to 50,000 and a molecular weight distribution (Mw/Mn) of not greater than 1.6, and
    a polymer block of B chain that comprises alkoxysilyl-containing (meth)acrylate units as constituent monomer units and has a number average molecular weight (Mn) of not higher than 5,000,
    wherein the alkoxysilyl-containing (meth)acrylate units as the constituent monomer units for the polymer block of B chain are at least one selected from the group consisting of 3-methacryloxypropylmethyldimethoxysilane, 3-methacryloxypropyltrimethoxysilane, 3-methacryloxypropylmethyldiethoxysilane, and 3-methacryloxypropyltriethoxysilane, and
    the A-B block copolymer as a whole has a molecular weight distribution of not greater than 1.6.

2. A process for producing the block copolymer according to claim 1, comprising:
    synthesizing the block copolymer by a living radical polymerization process that uses at least an iodine compound as a polymerization initiator compound.

3. The process according to claim 2,
    wherein the synthesizing by the living radical polymerization process is performed in the presence of a catalyst, which is at least one compound selected from the group consisting of phosphorous compounds, nitrogen compounds, oxygen compounds, and carbon compounds,
        wherein the phosphorous compounds are phosphorus halides, phosphite compounds, and phosphinate compounds,
        the nitrogen compounds are imide compounds, hydantoin compounds, barbituric acid compounds, and cyanuric acid compounds,
        the oxygen compounds are phenolic compounds, iodoxyphenyl compounds and vitamins, and
        the carbon compounds are diphenylmethane compounds, cyclopentadienes and acetoacetyl compounds.

4. A resin-treated pigment, wherein the resin-treated pigment is at least one pigment selected from the group consisting of an inorganic pigment and organic pigment, and
    the resin-treated pigment has been encapsulated with the block copolymer according to claim 1.

5. The resin-treated pigment according to claim 4, wherein the encapsulation has been achieved through a self-condensation reaction of alkoxysilyl groups in the alkoxysilyl-containing A-B block copolymer.

6. The resin-treated pigment according to claim 4,
    wherein the encapsulation has been achieved through a condensation reaction of hydroxyl groups on a surface of particles of one selected from the group consisting of the inorganic pigment, the inorganic pigment treated with an inorganic compound, and the organic pigment treated with an inorganic compound, with alkoxysilyl groups contained in the alkoxysilyl-containing A-B block copolymer.

7. The resin-treated pigment according to claim 4, wherein a mass ratio of the at least one pigment of the inorganic pigment and the organic pigment relative to the block copolymer is from 40/60 to 99/1.

8. The resin-treated pigment according to claim 4, wherein the inorganic pigment is at least one inorganic pigment selected from the group consisting of titanium oxide, zinc oxide, and pigments surface-treated with at least one compound selected from the group consisting of titanium oxide and zinc oxide.

9. A pigment dispersion, comprising the resin-treated pigment according to claim 4 dispersed in a dispersion medium comprising at least one medium selected from the group consisting of water, organic solvents, and resins.

* * * * *